United States Patent [19]
Daniel et al.

[11] Patent Number: 5,982,749
[45] Date of Patent: *Nov. 9, 1999

[54] ATM COMMUNICATION SYSTEM INTERCONNECT/TERMINATION UNIT

[75] Inventors: Thomas Daniel, Los Altos Hills; Dieter Nattkemper, San Jose; Subir Varma, Sunnyvale, all of Calif.

[73] Assignee: LSI Logic Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/612,112

[22] Filed: Mar. 7, 1996

[51] Int. Cl.⁶ .............................. H04L 12/56; G06F 3/00
[52] U.S. Cl. ...................... 370/233; 370/253; 370/395; 370/412; 395/200.8
[58] Field of Search .................... 370/232, 233, 370/235, 252, 253, 395, 396, 397, 400, 401, 412, 474, 905; 395/849, 200.62, 200.63, 200.64, 200.68, 200.8

[56] References Cited

U.S. PATENT DOCUMENTS

| | | | |
|---|---|---|---|
| 4,792,941 | 12/1988 | Yanosy, Jr. et al. | 370/58 |
| 4,947,388 | 8/1990 | Kuwahara et al. | 370/60 |
| 4,956,839 | 9/1990 | Torii et al. | 370/232 |
| 4,969,147 | 11/1990 | Markkula, Jr. et al. | 370/94 |
| 5,062,106 | 10/1991 | Yamazaki et al. | 370/94 |
| 5,072,442 | 12/1991 | Todd | 370/62 |
| 5,079,762 | 1/1992 | Tanabe | 370/60 |
| 5,105,424 | 4/1992 | Flaig et al. | 370/94 |
| 5,121,390 | 6/1992 | Farrell et al. | 370/94 |
| 5,130,975 | 7/1992 | Akata | 370/60 |
| 5,130,984 | 7/1992 | Cisneros | 370/94 |
| 5,136,584 | 8/1992 | Hedlund | 370/94 |
| 5,140,583 | 8/1992 | May et al. | 370/60 |
| 5,153,920 | 10/1992 | Danner | 380/48 |
| 5,157,662 | 10/1992 | Tadamura et al. | 370/110 |
| 5,166,926 | 11/1992 | Cisneros et al. | 370/60 |
| 5,175,818 | 12/1992 | Kunimoto et al. | 395/200 |
| 5,189,668 | 2/1993 | Takatori et al. | 370/427 |
| 5,214,642 | 5/1993 | Kunimoto et al. | 370/471 |
| 5,214,650 | 5/1993 | Renner et al. | 370/110 |
| 5,218,680 | 6/1993 | Farrell et al. | 395/200.06 |
| 5,220,563 | 6/1993 | Grenot et al. | 370/396 |
| 5,313,454 | 5/1994 | Bustini et al. | 370/13 |
| 5,379,297 | 1/1995 | Glover et al. | 370/60 |
| 5,414,702 | 5/1995 | Kudoh | 370/60 |
| 5,446,726 | 8/1995 | Rostoker et al. | 370/17 |
| 5,497,375 | 3/1996 | Hluchyj et al. | 370/232 |
| 5,515,363 | 5/1996 | Ben-Nun et al. | 370/253 |
| 5,521,916 | 5/1996 | Choudhury et al. | 370/60 |
| 5,524,006 | 6/1996 | Hluchyj et al. | 370/233 |
| 5,528,588 | 6/1996 | Bennett et al. | 370/60 |
| 5,530,806 | 6/1996 | Condon et al. | 395/185 |
| 5,533,009 | 7/1996 | Chen | 370/17 |
| 5,570,360 | 10/1996 | Klausmeier et al. | 370/232 |
| 5,583,863 | 12/1996 | Darr, Jr. et al. | 370/17 |
| 5,606,559 | 2/1997 | Badger et al. | 370/395 |
| 5,610,921 | 3/1997 | Christensen | 370/395 |
| 5,625,625 | 4/1997 | Oskouy et al. | 370/395 |
| 5,629,937 | 5/1997 | Hayter et al. | 370/233 |
| 5,649,110 | 7/1997 | Ben-Nun et al. | 395/200.19 |

*Primary Examiner*—Alpus H. Hsu

[57] ABSTRACT

An asynchronous transfer mode (ATM) digital electronic communication system includes an ATM communication system interconnection and termination unit (ATMCSI/TU). This ATMCSI/TU includes both a programmable microprocessor and several hardware-implemented coprocessors. The hardware-implemented coprocessors are under control of the microprocessor, and are dedicated to the performing of repetitive tasks. Thus, the microprocessor is freed to perform supervisory tasks in the ATM in addition to performing tasks associated with actual communication of digital data packages (i.e., CS-PDU's) in the ATM system. Thus, the APU is freed from doing repetitive data manipulation tasks, while these tasks are performed by one or more hardware-implemented coprocessors using memory mapped data structures and linked lists of data.

6 Claims, 17 Drawing Sheets

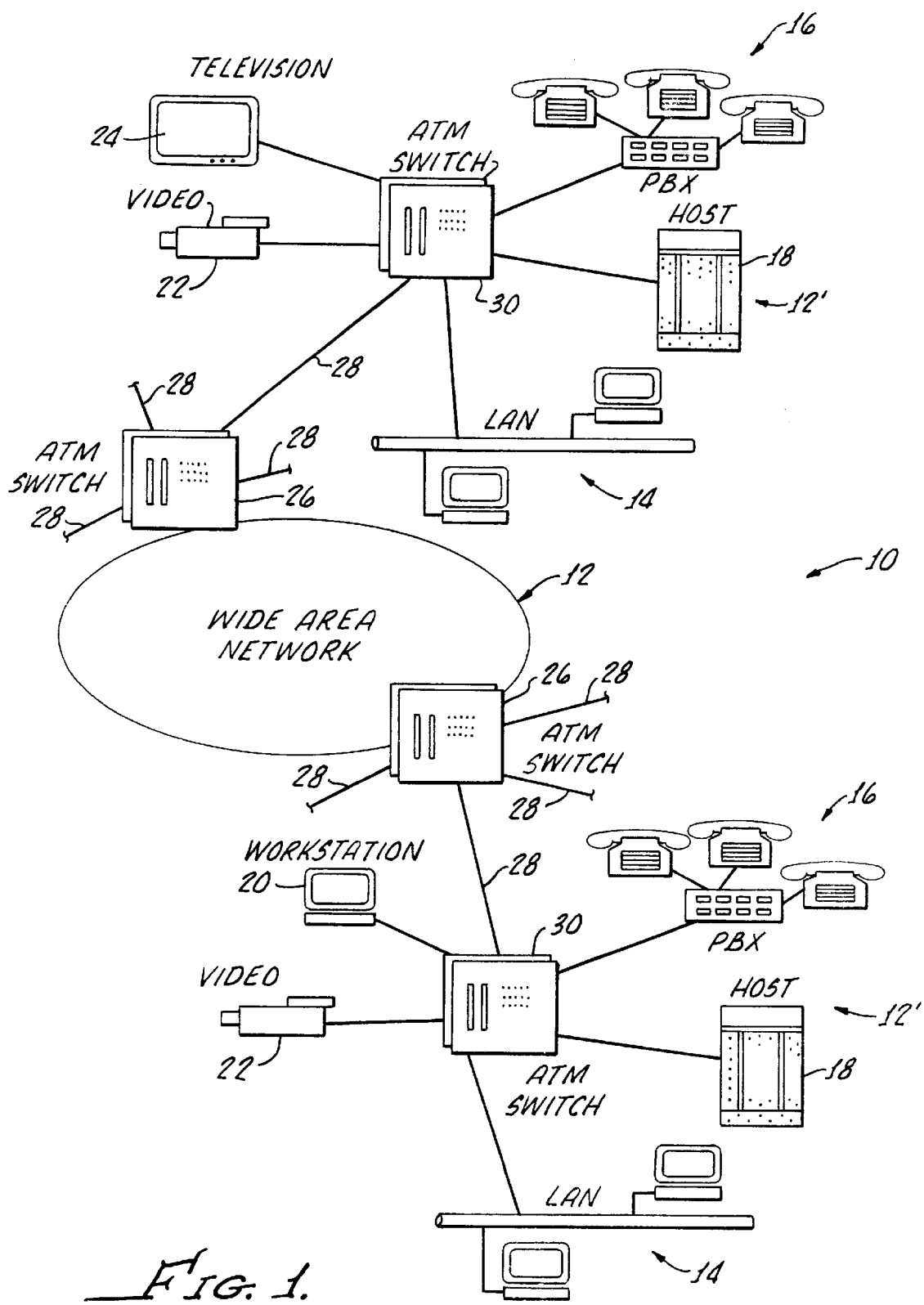
_Fig. 1._

| DIR | NAME | ADDR | SIZE | DESCRIPTION | INIT |
|---|---|---|---|---|---|
| TX/RX | CLASS | 1 | 4 | VC PRIORITY CLASS | 0 |
| TX/RX | NEXT VCD | 2 | 16 | NEXT VC ON A LINKED LIST | 0 |
| TX/RX | VCD CTRL | 4 | 16 | CONTROL BITS DESCRIBED IN THE TABLE 3-2 | YES |
| TX/RX | N BYTES | 6 | 16 | NUMBER OF BYTES LEFT IN THE BUFFER | 0 |
| TX/RX | P BUFF DATA | 8 | 32 | POINTER TO THE BUFFER DATA | - |
| TX/RX | CRC 32 | 12 | 32 | PARTIAL CRC 32 VALUE | - |
| TX | CELL HDR | 16 | 32 | ATM CELL HEADER | YES |
| RX | TIME STAMP | 16 | 32 | LAST TIME WHEN THE CONNECTION WAS SERVICED | - |
| TX | NEXT BFD | 20 | 16 | NEXT BUFFER NUMBER | 0 |
| RX | BUFF SIZE | 20 | 16 | SIZE OF THE CURRENT BUFFER | - |
| TX/RX | PAYLD LEN | 22 | 16 | TOTAL NUMBER OF BYTES IN THE CS-PDU PAYLOAD | - |
| TX/RX | TRAIL BFD | 24 | 16 | TAIL OF THE LIST OF BUFFER DESCRIPTORS | 0 |
| TX/RX | CURR BFD | 26 | 16 | CURRENT BUFFER NUMBER | 0 |
| TX/RX | UU | 28 | 8 | AAL5 USER-TO-USER INDICATION | 0 |
| TX/RX | CP | 29 | 8 | AAL5 COMMON PART INDICATOR | 0 |

| 31 | 24 23 | | 0 |
|---|---|---|---|
| BFD_CTRL | BUFFSIZE | CON NUM | |
| P BUFF DATA | | | |
| UU | CPI | UNUSED | |

| 31 | 24 23 | | 0 |
|---|---|---|---|
| | BURST SIZE | N BYTES | |
| P SRC DATA | | | |
| CRC 32 | | | |
| P DEST DATA | | | |

Fig. 9.

| NAME | ADDR. | SIZE | DESCRIPTION | INIT |
|---|---|---|---|---|
| BFD_CTRL | 0 | 8 | BUFFER DESCRIPTOR CONTROL BITS DESCRIBED IN THE TABLE 34 | YES |
| CON NAME | 1 | 24 | CONNECTION NUMBER TO WHICH BUFFER BELONGS TO | YES |
| BUFF SIZE | 4 | 16 | NUMBER OF BYTES IN THE BUFFER | YES |
| NEXT BFD | 6 | 16 | THE NEXT BUFFER DESCRIPTOR IN THE LIST | YES |
| P BUFF DATA | 8 | 32 | POINTER TO THE PAYLOAD | YES |
| UU | 12 | 8 | AAL5 USER-TO-USER BYTE | YES |
| CPI | 13 | 8 | AAL5 COMMON-PART-INDICATION BYTE | YES |

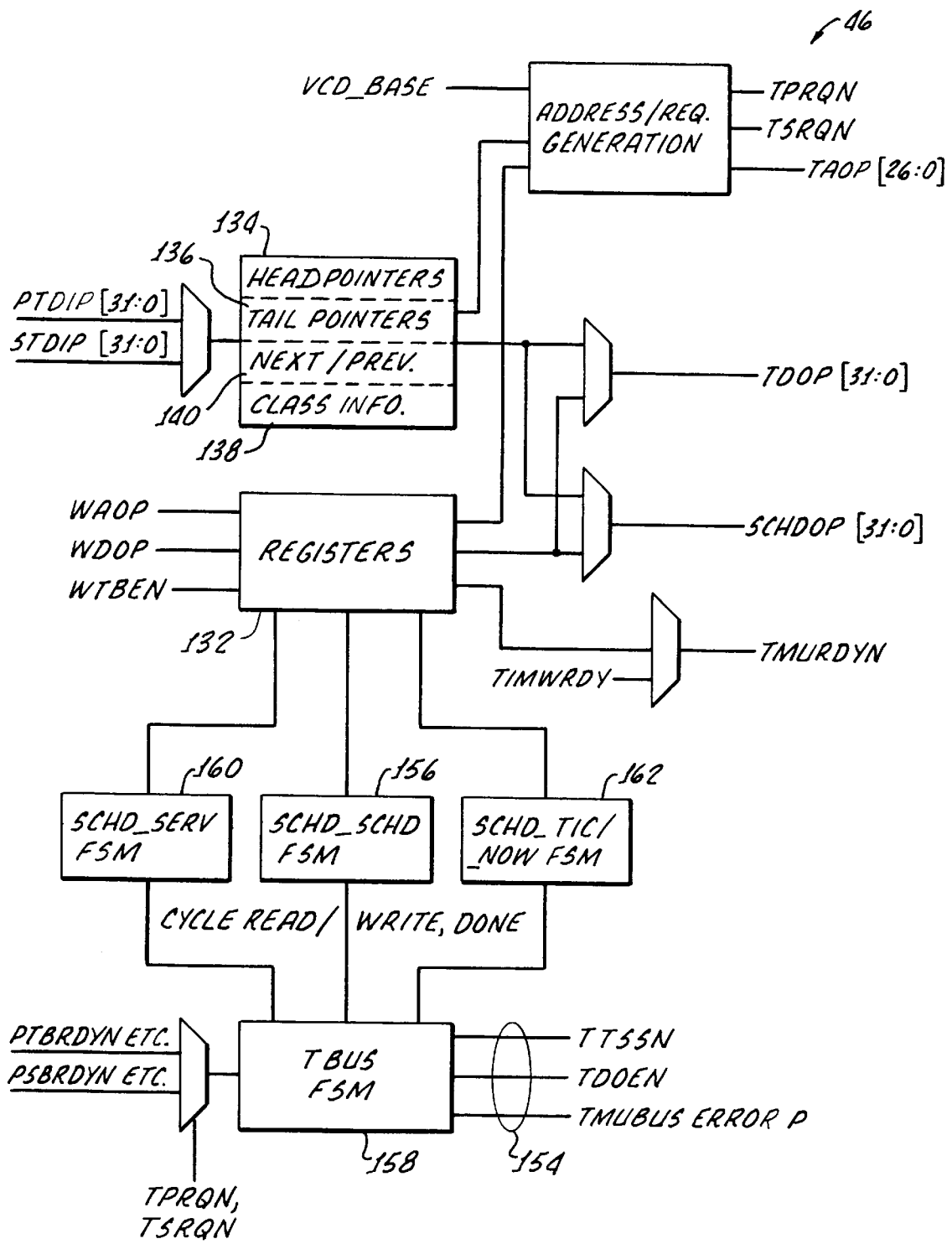
_Fig. 11b._

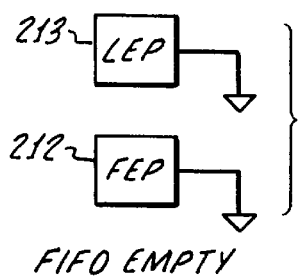
FIG. 15a.
FIFO EMPTY
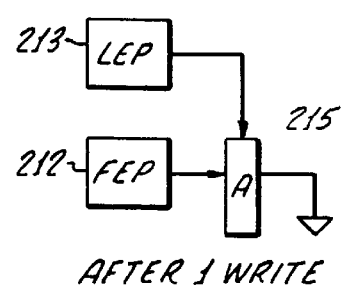
FIG. 15b.
AFTER 1 WRITE
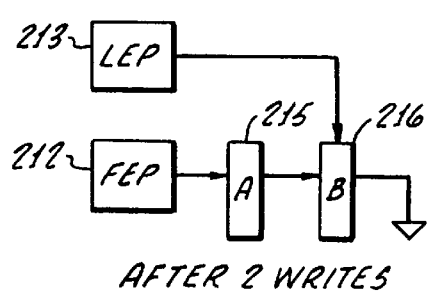
FIG. 15c.
AFTER 2 WRITES
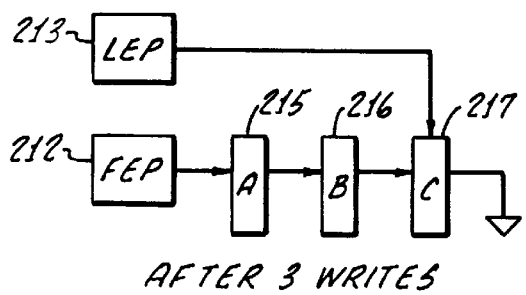
FIG. 15d.
AFTER 3 WRITES
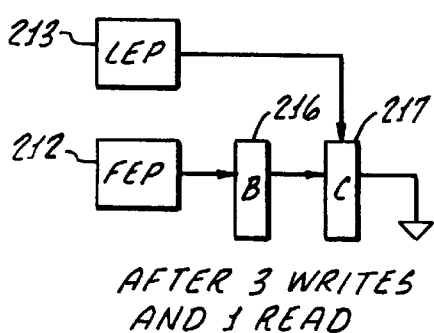
FIG. 15e.
AFTER 3 WRITES AND 1 READ
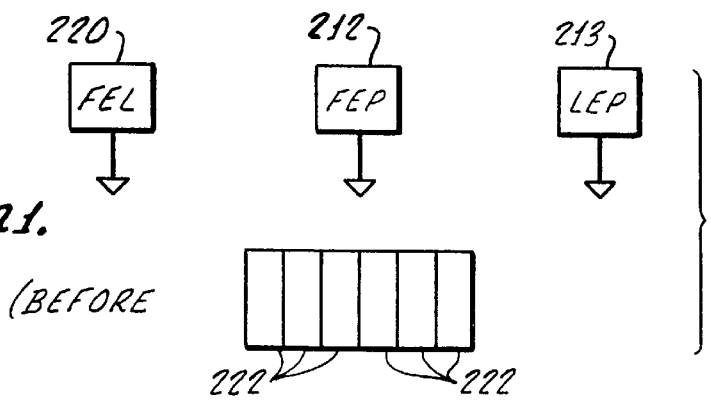
FIG. 16a1.
(BEFORE)
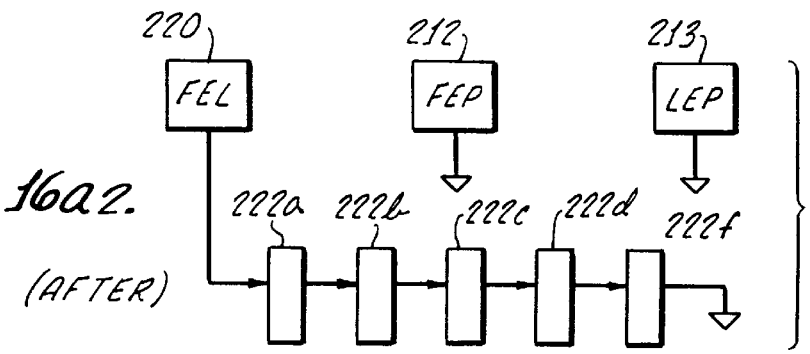
FIG. 16a2.
(AFTER)

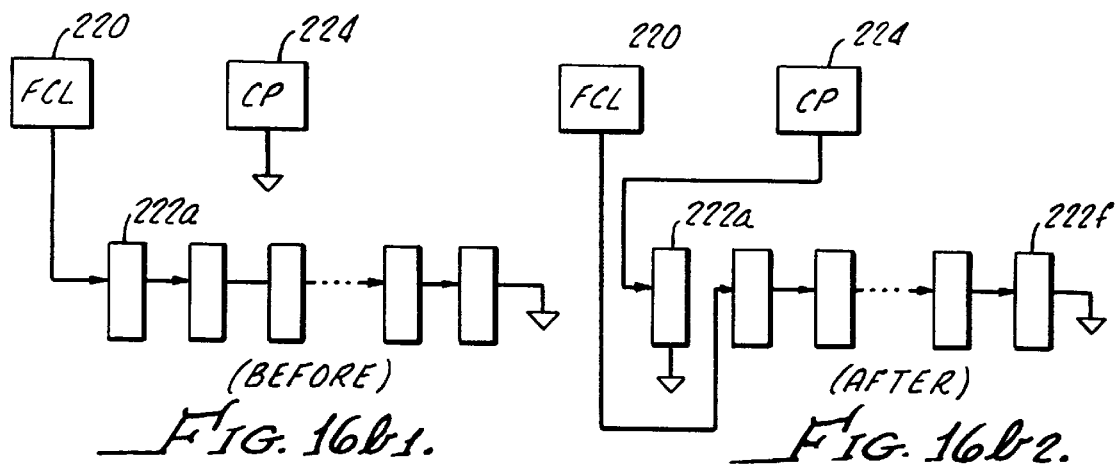
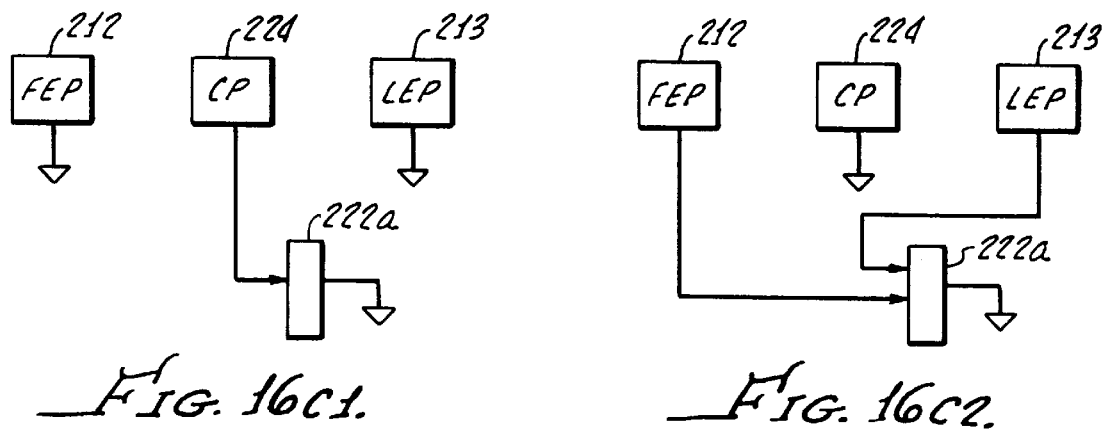
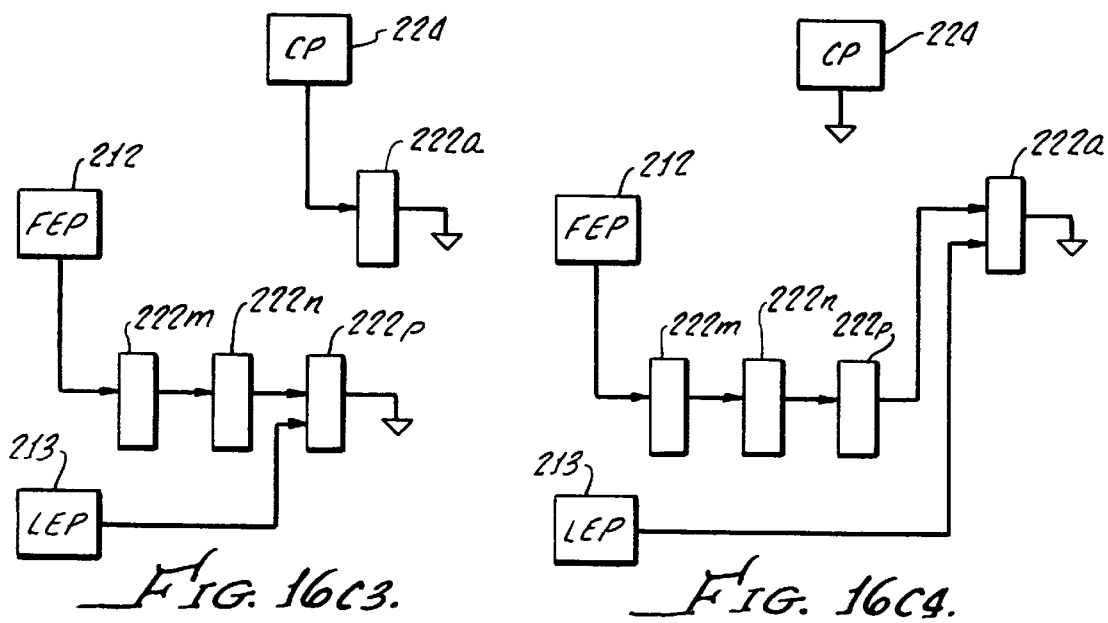

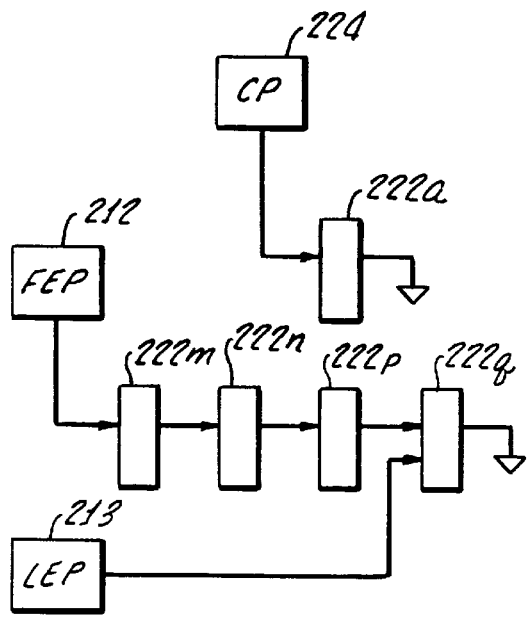
FIG. 16d1.
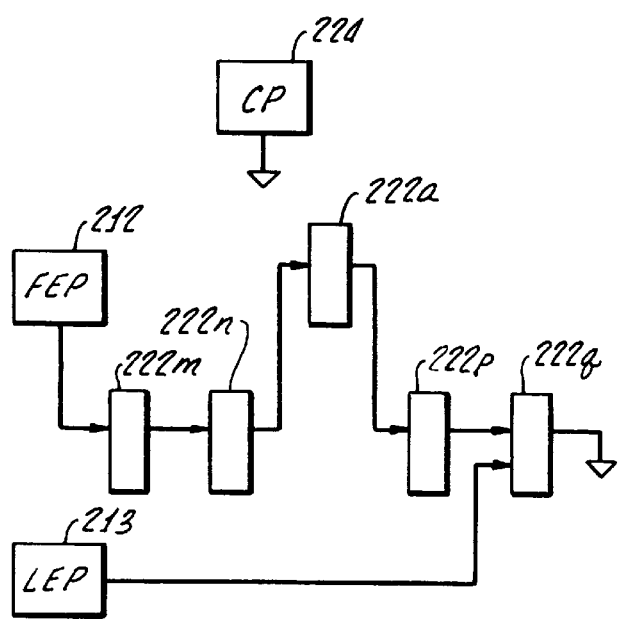
FIG. 16d2.
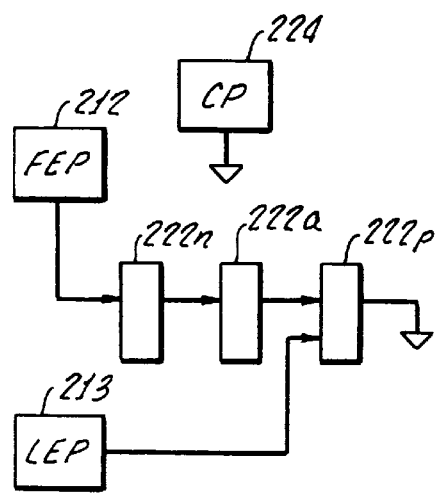
FIG. 16e1.
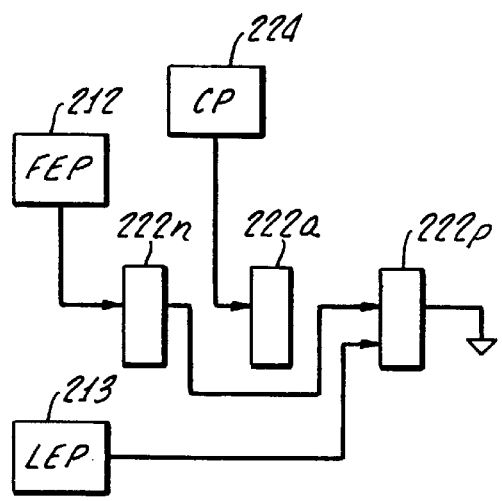
FIG. 16e2.

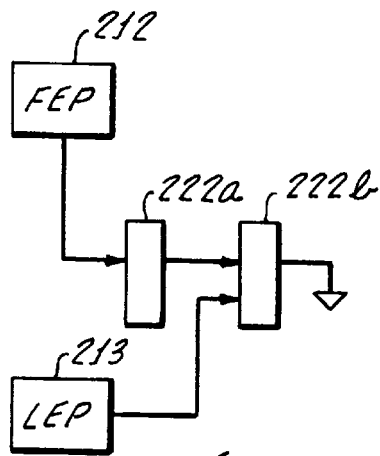
FIG. 16f1.
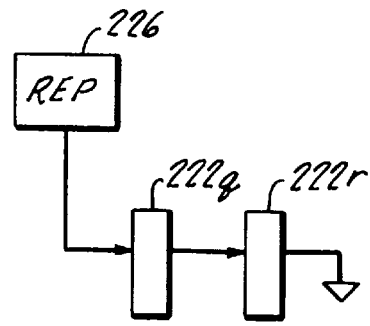
FIG. 16f2.
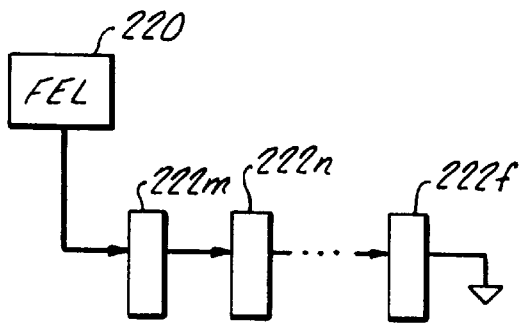
FIG. 16f3.
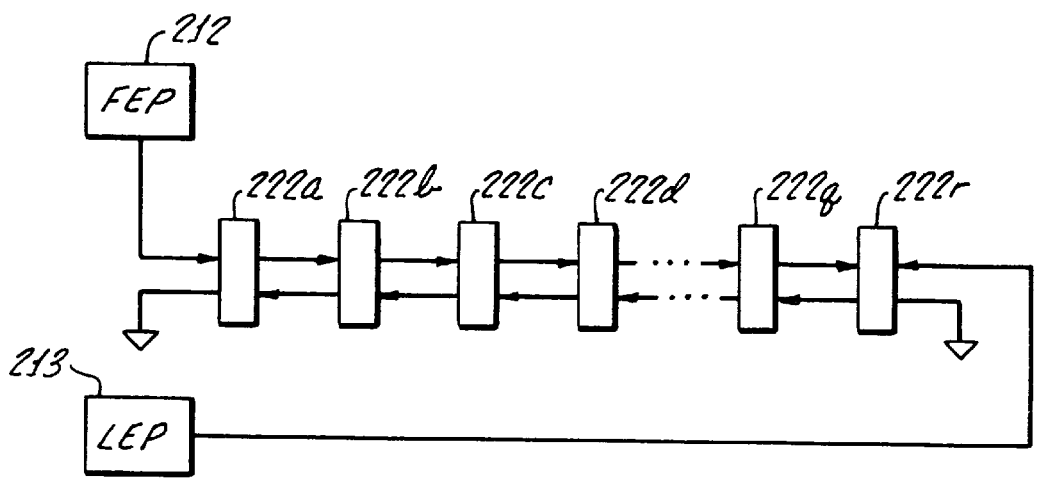
FIG. 16g.

ATM COMMUNICATION SYSTEM INTERCONNECT/TERMINATION UNIT

CROSS REFERENCE TO RELATED APPLICATIONS

The invention depicted and described in this application is related to an invention disclosed in application Ser. No. 08/510,643, filed 03 Aug. 1995, which is a file wrapper continuing application of application Ser. No. 08/139,998, filed Oct. 20, 1993, now abandoned.

The subject matter disclosed in this application is also related to the subject matter of the following applications, all of which are assigned to the same assignee as the present application:

Ser. No. 08/612,194, filed Mar. 07, 1996;
Ser. No. 08/612,373, filed Mar. 07, 1996;
Ser. No. 08/614,803, filed Mar. 07, 1996;
Ser. No. 08/614,804, filed Mar. 07, 1996; and
Ser. No. 08/614,806, filed Mar. 07, 1996.

COPYRIGHT NOTICE

A portion of the content of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is in the field of communication apparatus and methods. Generally, the invention relates to processing and organizing digital information for communication from one location to another. More specifically, this invention relates to use of asynchronous transfer mode in a communication network to communicate information. The communicated information is processed and organized in apparatus and according to methods disclosed herein. Still more particularly, the present invention relates to an ATM communication system interconnect/termination unit (hereinafter, "ATMCSI/TU").

2. Related Technology

Asynchronous Transfer Mode (ATM) is a network protocol which is highly advantageous because it allows high speed transmission of divergent types of data, including digital codes, video, and voice. This is accomplished by breaking down incoming digital data to be transmitted into units of constant size. These units are called cells, and include a 48-octet field containing the actual data; along with a header field, for a total of 53 octets in the cell. A Conversion Sublayer Protocol Data Unit (CS-PDU) may have both a header and a trailer of additional information, and may be as long as 64K bits. The process of communicating these cells involves taking digital data and segmenting it into cell-size units and assembling these units into CS-PDU's. At interconnections, the CS-PDU's are segmented and reassembled to route cells to their destinations in accord with the communication traffic load of the network, the class of service for the senders of the cells, and a variety of other parameters familiar to those skilled in the pertinent arts.

The header contains a virtual channel identifier and a virtual path identifier which identify the particular cell and its intended destination, and specify an optimal path through the network along which the cell should be routed to reach its destination. The header can also include numerous other information such as the type of data in the CS-PDU and attributes of the data, the sender and/or the destination. In combination, the virtual path identifier and virtual channel identifier define a virtual circuit within the network. This virtual circuit is unlike the old and well known actual hard-wired communication circuits of conventional telephone and data transmission systems, for example, because it does not actually provide a fixed or constant communication path (i.e., an electrical conductor, twisted-pair conductors, radio link, or fiber-optic light conductor, for example) continuously extending between the end points. A virtual circuit is continually reconfigured (i.e., possibly following a succession of several different alternative network paths) as the operating circumstances of the network change dynamically.

The ATM-protocol data may be transmitted along a digital electronic data network. A series of cells or packets communicated between endpoints of the network effectively provides a communication circuit between these endpoints. Such communication networks are becoming increasing widespread. These networks allow for the communication of divergent types of data including computer-coded text and graphics, voice, music, images, and video. Such networks enable the interconnection of large numbers of computer work stations, telephone, television systems, video teleconferencing systems, and other facilities over common data links or carriers.

Computer work stations are typically interconnected by local area networks (LAN) such as Ethernet, Token Ring, DECNet and RS-232, whereas metropolitan, national and international systems are interconnected by wide area networks (WAN) such as T1, V3.5 and FDDI.

LANs and WANs themselves can be interconnected by devices known as hubs, bridges and routers in an unlimited configuration. Although the distinction between these interconnection devices is becoming increasingly arbitrary, they are officially classified in accordance with the layer in the Open Systems Interconnection (OSI) model in which they operate.

Hubs interconnect devices using the Physical Layer, bridges utilize the Data Link layer, whereas routers operate using the Network layer. Hubs and bridges generally act merely as switches or funnels, whereas routers perform higher level functions including selecting optimal routes through the network for transmission of data packets or cells on an individual basis, and performing network management tasks such as forcing diagnostics operations and controlling other routers or nodes. Whereas hubs and bridges generally operate on data which is formatted in a single protocol such as those listed above (i.e., uni-protocol), routers can typically identify and process data which can be in any one of several protocols (multi-protocol).

Interconnect devices, especially the more sophisticated routers, have typically been large, bulky and expensive units which operate at relatively low speed. As such, they limit the data throughput speed in the network in which they are installed. The reasons why routers have been so slow is that they are generally multi-chip units which transfer data being processed to and from Content Addressable Memory (CAM) chips which are separate from the processor, input/output (I/O) and other functional chips of the unit. These data-transfer operations each require multiple system clock cycles which fundamentally limit the data transfer speed. In addition, multiple latencies are present in the various paths by which data moves through the unit. The degree by which such latencies can be reduced, as well as the degree by which the size and cost of a multi-chip system can be reduced, are also fundamentally limited.

It should be recalled that the digital communication connections (i.e., virtual circuits) maintained by an ATM system may belong to different classes of service. The reasons for these differing classes of service have to do with the differing types of digital data being communicated. Video connections, for example, do not require the same class of service as do file transfers. A file transfer is not sensitive to delay, while a video connection certainly is sensitive to transmission delay. Similarly, an audio connection is not sensitive to cell loss, while a file transfer is very sensitive to cell loss. With an audio connection, the loss of a cell in not noticeable to the recipient of the conversation because the human ear is not sensitive enough to detect the small gap in the conversation. The human ear takes meaning from context, so that a small gap in the sound of a word would probably not even be noticed. On the other hand, a file transfer is very sensitive to loss of a cell. A missing cell from a file transfer means that the received file is deficient and incomplete, and that the file data may be meaningless without the missing data.

Consequently, differing classes of service are provided to users of ATM systems. One class of service is constant-bit-rate (CBR) service, and is commonly used for audio communications and un-compressed video information. With constant-bit-rate service a cell is transmitted from a given connection on a regularly repeating time interval, perhaps one cell every couple of microseconds. Another class of service is variable-bit-rate (VBR) service, and is commonly used to transmit compressed video data. The cell rate in this instance is variable dependent on the video compression technique in use and the video image contents (i.e., rate of video image change or frames per second). Understandably, managing these variable-bit-rate services becomes a burdensome task when a multitude of connections (perhaps in the thousands) are being maintained simultaneously.

A conventional asynchronous transfer mode (ATM) speech-path switching system is depicted in U.S. Pat. No. 4,956,839, issued Sep. 11, 1990 to Torii Yutaka, et al. The '839 patent is believed to disclose an ATM line terminating apparatus serving to physically terminate a transmission line and to perform processing of received information in ATM format. That is, information contained in a header filed of a received cell or packet is processed. The ATM terminating apparatus includes a cell-phase synchronizing circuit for matching the temporal positions of cells in each of the lines; and a flow monitor circuit for performing control to avoid overload of the subscriber terminal according to a service agreement, for example.

Another conventional ATM switch and multiplexer is known in accord with U.S. Pat. No. 5,189,668, issued Feb. 23, 1993 to Mashiro Takatori, et al. The '668 patent is believed to disclose an ATM switch having a plurality of concentration space-division switches each constituted with an multi-stage connection of switch modules. Each of the switch modules in a stage includes a certain number of buffers and a selector for arbitrating outputs from the buffers. Each stage includes switch modules of a number at most equal to the certain number of buffers of the stage multiplied by the number of switch modules in a preceding stage. The multiple stages include a final stage with a singular switch module.

Still another conventional ATM switching system and adaption processing apparatus is disclosed in U.S. Pat. No. 5,214,642, issued May 25, 1993 to Masao Kunimoto, et al. The ATM apparatus of the '642 patent is believed to include an adaption-processing apparatus for assembling received data units of fixed length to provide variable-length data units. These variable-length data units are transmitted to a plurality of variable-length data unit processors while assembling variable-length data units received from the plurality of variable-length data unit processors to provide fixed-length data units for transmission therefrom. This ATM switching system includes an adaptation processing apparatus, a signal processing unit having a plurality of the variable-length data unit processors, and first-in-first-out (FIFO) memory for the variable-length data units provided from the adaptation process.

Further, a conventional ATM network device is known in accord with U.S. Pat. No. 5,220,563, issued Jun. 15, 1993 to Thierry Grenot, et al. The '563 patent is believed to relate to a device for acquiring the signalling data elements of each channel of multi-frame data, and for detecting the changes in state of these data elements. A device generates an information cell on the network for each change thus detected, with the information cell including the new signalling data elements. The information cell also includes the address information associated with the corresponding channel. A device is included for receiving and memorizing the information cells from the network, and for inserting the data elements thus memorized into a multi-frame for transmission synchronously in out-of-band mode.

Another interconnection system to which the invention generally relates is disclosed in U.S. Pat. No. 5,218,680, issued Jun. 8, 1993 to J. Farrell et al.

Generally, the conventional technology for ATM termination and interconnection devices can be characterized as offering users only two choices in architecture. One architecture implemented all functions in hardware and was not flexible to evolving technology and situations as the uses of ATM develop. The other architecture executed all commands in software, so that the users of the device could program their choices with respect to how the device functioned in particular situations. However, because all of the commands and CS-PDU processing operations were performed in software by using a processing unit, the devices were slow, and represented a bottleneck in the system. That is, under conditions of heavy or complex traffic, the processor simply was not able to execute enough instructions and process enough CS-PDU's to keep up with demand.

In ATM technology there is a concept of virtual connections. These might be though of as a virtual pipeline connecting users of the network, but each pipeline serves more than one pair of users. That is, traffic from several users flows along the same pipeline interspersed with one another in fragments. As an example, a computer video session between two users might go through one pipeline, while a file transfer between two other users is also going on through the same pipeline. Each of these communications would use different virtual connections, although they would both go through the same physical structure (i.e., fiber optic cable or twisted-pair telephone lines, for example). In the conventional technology, all the processing could be commanded by software (with the speed limitation alluded to above), or by hardware (with the ATM system having a rigidity in its nature because changing the abilities of the system required new hardware).

A disadvantage of the related technology arises from old methods of implementing a first-in-first-out (FIFO) memory. Traditionally, FIFO memories have been implemented by using one of a "fall through", or a "memory and counter" architectures. With a fall through architecture, a set of cascaded registers are used, and new data entered into the FIFO falls through the registers until it reaches the last free location. When data is read from the FIFO memory, it is taken from the bottom register, and the content of the other higher registers has to be rewritten successively one register down in the cascade of registers. In the memory and counter implementation, of a FIFO memory, a memory area with register locations, along with separate read and write counters, are maintained. Data elements are written into memory register locations pointed to by the write counter, and read from locations pointed to by the read counter. The counters are individually incremented one register location along the list after each respective read or write operation. After reaching the end of list, the counters rotate individually to the beginning of the memory register locations so that FIFO operation is maintained.

A disadvantage of these conventional FIFO memory implementations results from the inability to either insert new data into the memory, or to remove data from the memory, except at the tail or head end of the list, respectively. However, in ATM operations, including SAR operations in association with receiving or transmitting cells, it is necessary to alter the order of cell reassembly and transmission, for example, in response to the requirements to provide differing classes of ATM service, and to prevent loss of cells from an un-interruptable service during intervals of network conflict or congestion.

Another disadvantage of the conventional technology stems from the conventional calendar structures used to schedule future events in the device. The conventional calendar structures include an array of cell slots with an event pointer that advances one array position for each cell slot time interval. Events that need to be scheduled at a future time have their event descriptor attached to the appropriate location in the array. This attachment may be effected by use of a linked list, for example. When the event pointer gets to the location of a particular event, the event is then scheduled. In case more than one event is scheduled in the same cell slot, then the event descriptors for the events are linked together by means of the linked list structure. A significant disadvantage of the conventional calendar method is that memory requirements are excessive. For example, if the rates of events to be supported is large, a minimum rate of 1 cell/sec for an OC-3 link at 150 mbps, for example, requires an array of 353,000 entries. Because each entry has a head and a tail pointer with four bytes for each, the total memory requirement is 2.82 Mbytes just for a calendar.

SUMMARY OF THE INVENTION

In view of the deficiencies of the conventional technology for ATM systems, a primary object is to avoid one or more of these deficiencies.

An additional object is to provide an ATM interconnection and termination device which combines the features of software programmability and hardware-implemented speed in processing CS-PDU's received or for transmission.

In view of the deficiencies and limitations of the related conventional technology, there is a need for an ATM interconnection and termination unit which can meet 155 megabits per second (MB/s) full-duplex operation rates, while performing segmentation and reassembly (SAR) of AAL5 CS-PDU's.

Further to the above, an object of this invention is to provide a ATMCSI/TU in which certain functions that conventionally were performed in firmware which are now performed in a specialized enhanced direct memory access (EDMA) module.

Accordingly, an object for this invention is to provide an ATMCSI/TU in which a memory-resident data structure provides an interface between the ATM software protocol engines, ATM hardware protocol engines, and coprocessor functions that may include multiple hardware elements. The data structure includes one data structure per transmit virtual circuit connection, and one cell per reception virtual circuit connection.

Still further, an object for this invention is to provide such a ATMCSI/TU in which the EDMA is utilized as a specialized high-speed hard-wired AAL5 SAR engine.

Additionally, on object of this invention is to provide such a ATMCSI/TU in which other ATM adaptation layers, such as AAL1, and AAL3/4, are supported with a minimum of involvement from the imbedded processor of the ATMCSI/TU.

Accordingly, an ATMCSI/TU embodying the present invention is implemented on a single integrated circuit chip. The single-chip ATMCSI/TU system includes an ATM processing unit (APU) based on a 32-bit superscalar MIPS central processing unit (CPU), preferably operating at 66 MHz to provide 100 MIPS; a 32-bit, 66 MHz EDMA engine with hardware support for AAL5; master-and-slave Utopia Level 2, multi-PHY ATM cell interface; a timer unit with real-time timers; a scheduler unit; a primary port interface; and a secondary port interface.

An additional object for this invention is to provide such a single-chip ATMCSI/TU system in which the processor memories and the cell buffer memory RAM are included in the single-chip ATMCSI/TU.

Advantages of the present invention include the provision of high-functionality primitives as an interface mechanism between the hardware and software functions. The primitives will be seen to reduce the computational burden on the CPU. Also, the primitives allow implementation in either hardware or software of buffer memory management schemes. Additionally, a primitive in the VC descriptor allows scheduler schemes to be implemented in either hardware or software. A hardware scheduler can build a linked list of VCD's identifying cells of CS-PDU's to be transmitted. The SAR engine uses this linked list to determine which VC to transmit next, and as long as the scheduler stays ahead of the SAR engine, no software intervention is required. An arbitrary number of VC's is supported, in contrast to conventional technologies which have a fixed number of VC's which can be supported.

An additional object for this invention is to provide an ATMCSI/TU using a single architecture which is capable of implementing almost any conceivable flow-control algorithm for ATM applications.

Another object for this invention is to provide such an ATMCSI/TU in which a programmable CPU is tightly coupled to multiple hardware-coprocessors. The interface between the CPU and the hardware coprocessors is to be defined by multiple data structures which provide bi-directional control and status signalling between the multiple hardware elements and the CPU.

Accordingly, the present ATMCSI/TU provides a virtual circuit descriptor, a buffer descriptor, and hardware registers providing an interface between multiple hardware and software elements of the ATMCSI/TU. This data structure permits the concurrent execution of a flow control algorithm in both software and hardware elements.

In view of the above, the present ATMCSI/TU provides a floating point multiplier unit with extensions for ATM Forum format, other flow control specific CPU instructions, general purpose timers, and a SAR engine discriminator capable of stripping out flow-control-related cell traffic from the ordinary data path cell traffic.

An additional advantage of the present invention is that it allows the flexibility to change flow control algorithms by running a different software algorithm. Also, multiple simultaneous algorithms may be run so that flow control may be determined by a selected or most advantageous method. Also, this flexibility allows the flow control algorithm to be changed on a per-VC basis during system operation. The flexibility of the system allows also an achievement of an optimized split between hardware implemented computationally-intensive operations, and flow-control specific operations which are implemented in software.

Still another object for this invention is to provide an ATMCSI/TU which will support either a user-defined software implemented buffer memory management scheme, or a default hard-ware implemented efficient buffer memory management scheme. That is, a user of the ATMCSI/TU may select a software-coded memory management scheme, or may allow the ATMCSI/TU to default to an internal software-driven efficient buffer memory management scheme.

Thus, an advantage of the invention is that buffer memory management can be implemented on a per-VC basis. For applications which run on a dynamic memory environment this implementation has become important. For example, if memory resources are low, then it may be an advantage to switch buffer memory allocation algorithms. Also, providing different buffer management schemes on an ATM-layer-service-category basis may be an advantage. The present invention allows these options. Further, the memory management scheme is run on a time-modified basis. That is, if the software implemented user-defined management scheme misses a time deadline, then the system defaults to the internal efficient scheme to assign the buffer memory addresses as required.

Yet another object for this invention is to provide an ATMCSI/TU having a linked-list implementation of first-in-one-out memory for the SAR cell-buffer memory.

An advantage of the invention is that the FIFO memory as implemented in a linked list format allows easily including data elements in the middle of the FIFO structure; and the deleting of data elements from within the FIFO data structure, with the remainder of the FIFO linked list being undisturbed. There is no need to copy data elements from one memory location to another when manipulating data. Simply changing the content of linked-list linking registers in the linked list memory structure will serve to manipulate the data in its present memory locations.

Still another object for this invention is to provide an ATMCSI/TU having a hierarchical calendar. That is, rather than using a conventional memory-intensive flat calendar with respect to which an event pointer moves at a fixed rate for determining when the time has arrived to transmit cells from a connection for purposes of traffic shaping, the present invention provides a hierarchical calendar using far less memory.

Accordingly, the present invention provides an ATMCSI/TU having a calendar structure of at least two levels (i.e., hierarchies), and with separate pointers at the levels, the pointer of the lowest level moving from location to location with a time period equal to a single cell slot interval; and the pointer of the next higher level moving from location to location with a time period equal to the number of locations in the lower level multiplied by the single cell slot interval.

An advantage of this aspect of the invention results from the reduction in memory requirements for the calendar. That is, the ATM system can realize a wide range of memory-requirement versus processing-requirement tradeoffs. A reduction in memory requirement may come at the expense of increased processing requirements, and vice versa, but the user of the ATMCSI/TU who has a good idea of the traffic profile to be supported may choose appropriate sizes for the levels of the calendar such that system overhead in memory and processing requirements are not excessive.

Still further, the present invention has as an object the provision of an ATMCSI/TU having a scheduler-based and variable transmission interval technique for traffic shaping of a variable-bit-rate (VBR) traffic stream.

Accordingly, the present invention provides an ATMCSI/TU having a scheduler-based implementation of a traffic shaper rather than a more conventional timer-based traffic shaper.

An advantage of the scheduler-based traffic shaping carried out by the present invention is a reduction in CPU workload, and an increased data transfer rate.

Additional objects and advantages of the present invention will appear from a reading of the following detailed description of a single embodiment of the present invention taken in conjunction with the following drawing figures, in which like reference numerals indicate like structures or features.

BRIEF DESCRIPTION OF THE DRAWING FIGURES

FIG. 1 is a block diagram of a typical electronic digital data communication network embodying the present invention;

Figure 6:
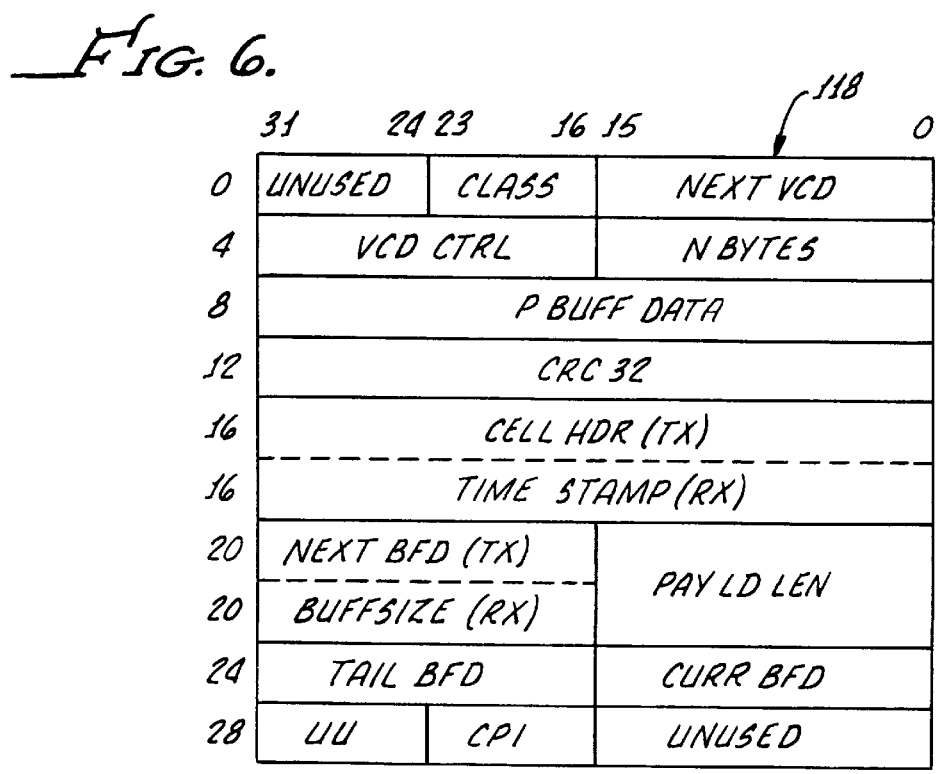
FIG. 6 is an illustration of a matrix-like, memory-resident data structure used by the EDMA of the present invention.
Figure 11A:
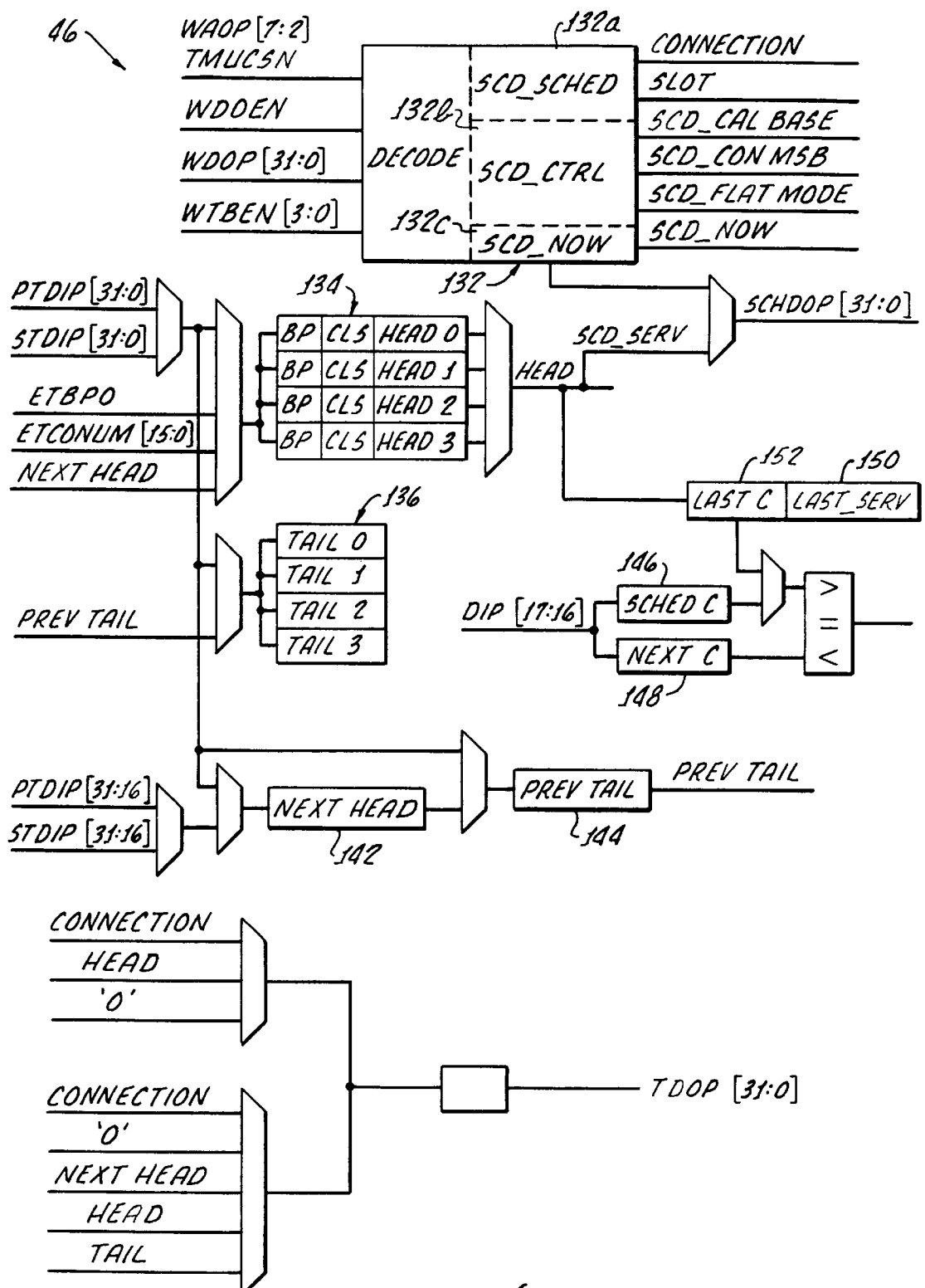
Figure 12:
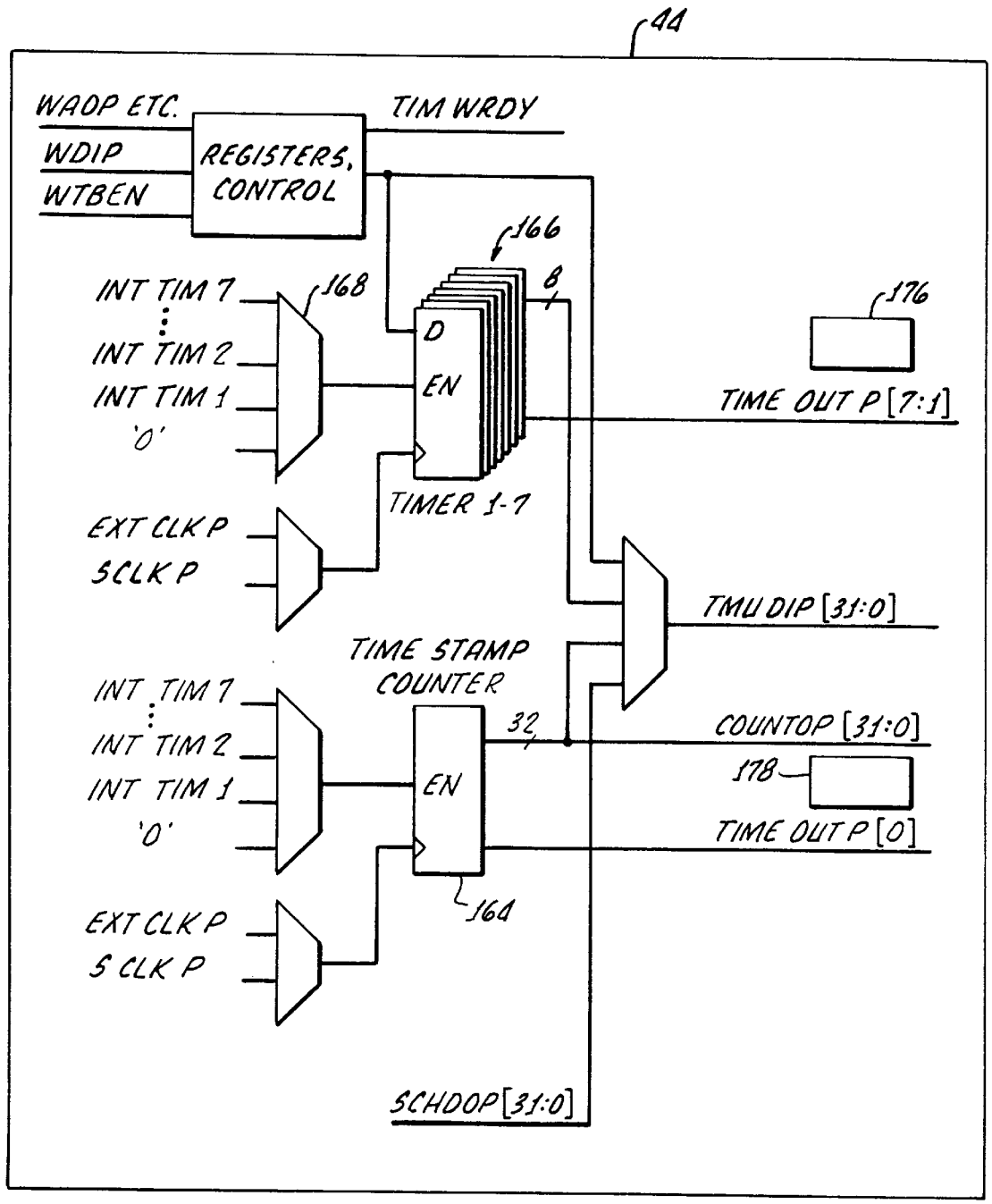
Figure 13:
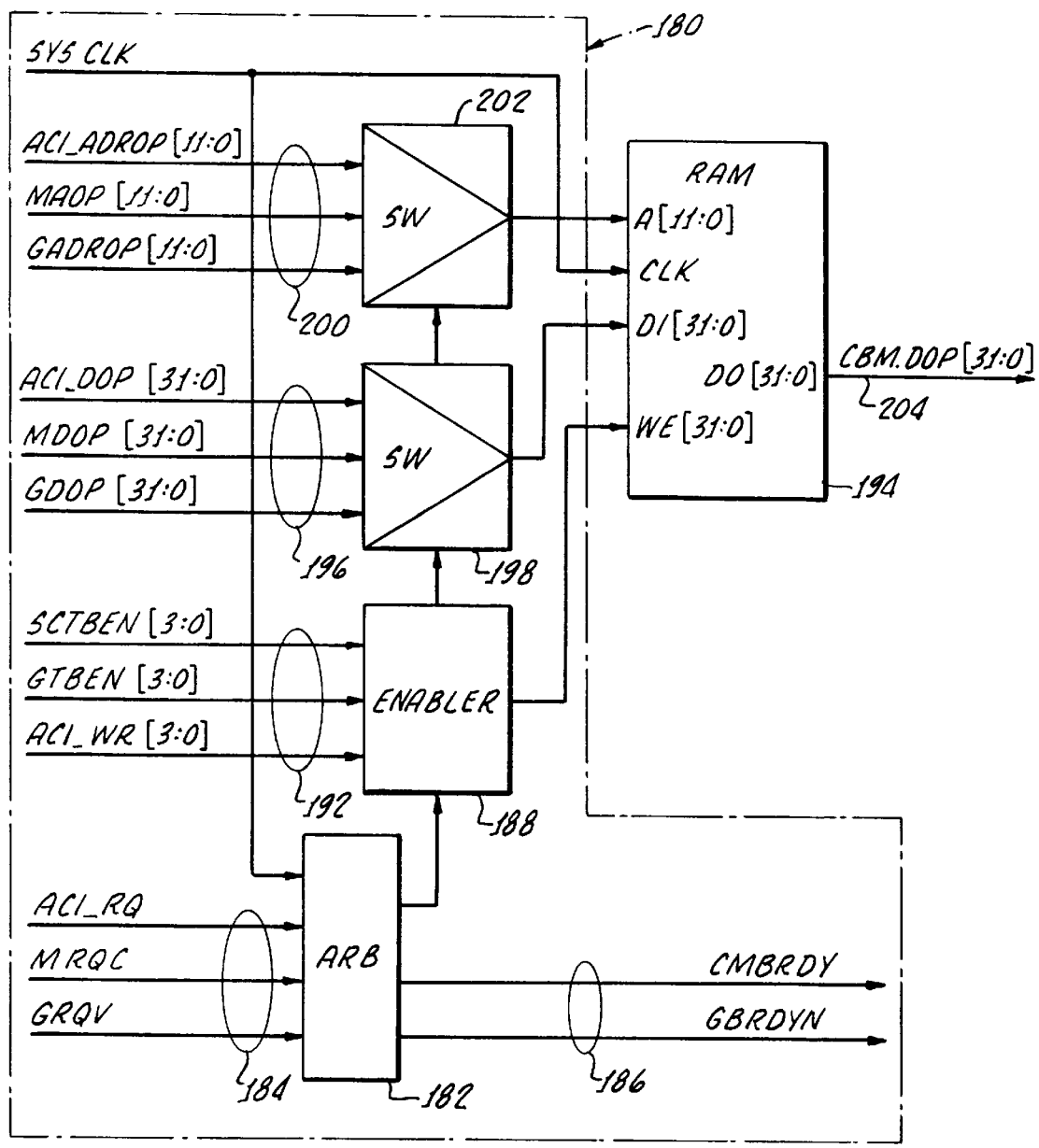
Figure 14:
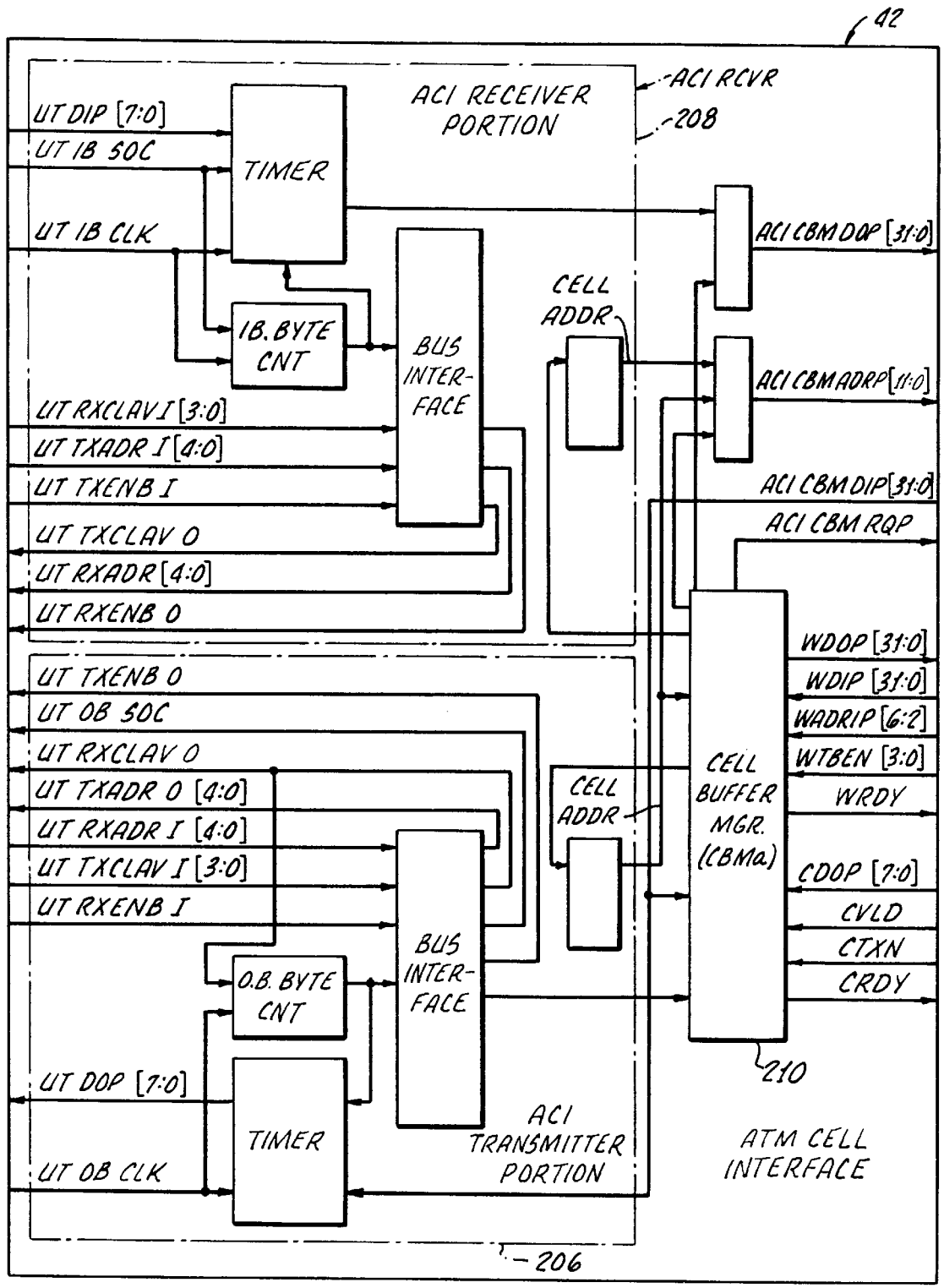
Figure 17A:
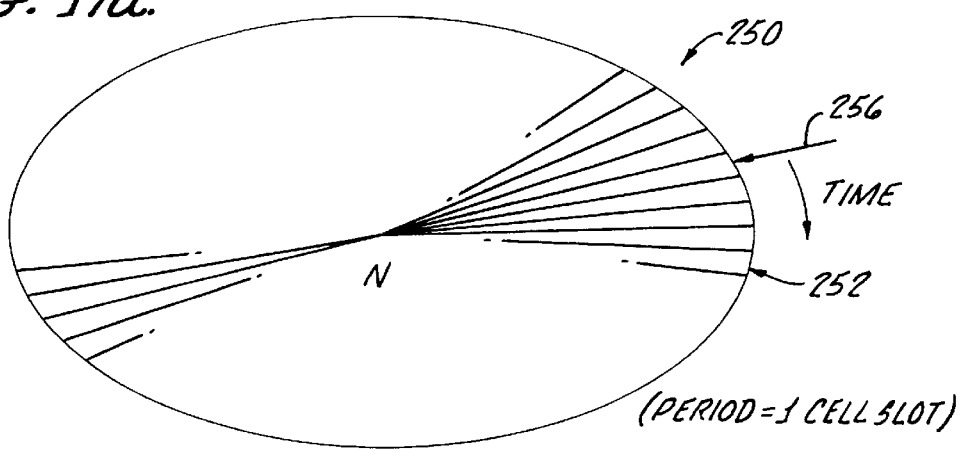
Figure 17B:
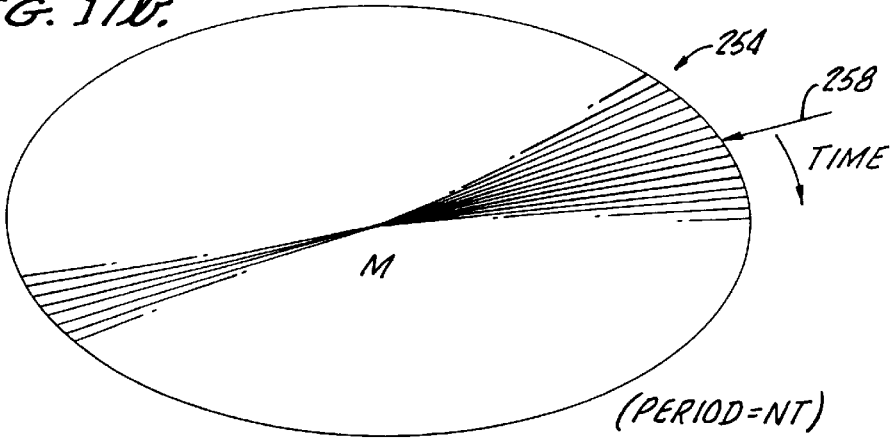

FIG. 7 provides a table listing the name, address, size, and description of particular data fields within the data structure depicted in FIG. 6;

FIG. 8 is a diagram illustrating another matrix-like, memory-resident data structure used by the EDMA of the present invention;

FIG. 9 provides a table listing the name, address, size, and description of particular data fields within the data structure depicted in FIG. 8;

FIG. 10 is an illustration of another matrix-like, memory-resident data structure similar to that illustrated by FIG. 6, and which is used by the EDMA of the present invention;

FIGS. 11a and 11b respectively provide a schematic block diagram of the scheduler unit of the preferred embodiment of the invention, and a Data Path diagram for this scheduler unit;

FIG. 12 is a schematic block diagram of the timer unit of the preferred embodiment of the invention;

FIG. 13 is a schematic block diagram illustrating a cell buffer memory of the preferred embodiment of the invention;

FIG. 14 provides a schematic diagram illustrating a ATM input/output port (ACI) portion of an ATMCSI/TU embodying the present invention;

FIGS. 15a–15e are a set of time-sequence diagrams schematically illustrating a sequence of events in a FIFO memory implementation according to the invention;

FIGS. $16a_1$ and $16a_2$ are a set of diagrams illustrating a FIFO memory implementation using linked-list data structure before the creation of the list and after the creation of the list;

FIGS. $16b_1$ and $16b_2$ are a set of diagrams illustrating the operation of removing the first element of a FIFO memory queue;

FIG. $16c_1$ through $16c_4$ are a set of diagrams illustrating how a memory segment containing ATM data is placed in the FIFO queue using the linked-list data structure;

FIGS. $16d_1$ and $16d_2$ are a set of diagrams illustrating how a memory segment, also referred to as data cells, may be placed in the middle of the FIFO memory implementation using linked-list data structure;

FIGS. $16e_1$ and $16e_2$ are a set of diagrams illustrating how an memory segment containing an ATM data cell may be removed from the middle of a FIFO queue implemented using linked-list data structure;

FIGS. $16f_1$ through $16f_3$ are a set of diagrams illustrating how segments of memory may be reserved without affecting the operations on other segments of the memory;

FIG. 16g illustrates how the FIFO queue may be implemented using doubly linked-lists; and FIG. 17a and 17b are a diagrammatic illustration of a hierarchical calendar of an ATMCSI/TU embodying the present invention;

DETAILED DESCRIPTION OF AN EXEMPLARY PREFERRED EMBODIMENT OF THE INVENTION

Following is a list of abbreviations used in depicting, describing, and defining this invention:

| | |
|---|---|
| AAL0–5 | ATM Adaptation Layer (0–5 refers to the layer of the ATM communication system architecture) |
| ACI | ATM Cell Interface |
| ABR | Available Bit Rate |
| APU | ATM Processing Unit |
| ATM | Asynchronous Transfer Mode |
| ATMCSI/TU | ATM Communication System Interconnect/ Termination Unit |
| BFD | Buffer Descriptor |
| CBM | Cell Buffer Memory |
| CBMa | Cell Buffer Manager |
| CGCR | Channel Group Credit Register |
| CP | Cell Pointer |
| CS | Convergence Sublayer |
| CS-PDU | Conversion Sublayer Protocol Data Unit (i.e., a data payload packet) |
| EOM | End of Message |
| FEP | First Element Pointer |
| FCL | Free Cell List |
| GCRA | Generalized Cell-Rate Algorithm |
| GRPR | Global Rate Pacing Register |
| LAN | Local Area Networks |
| LEP | Last Element Pointer |

-continued

| | |
|---|---|
| LMB | Local Memory Bus |
| MSB | Main System Bus |
| MBS | Maximum Burst Size |
| PBX | Private Branch Exchange |
| PCR | Peak Cell Rate |
| PPI | Primary Port Interface |
| PRPC | Peak Rate Pacing Counters |
| RAM | Random Access Memory |
| SAR | Segmentation And Reassembly (sublayer) |
| SCR | Sustainable Cell Rate |
| SU | Scheduler Unit |
| SPI | Secondary Port Interface |
| UNI | User-to-Net Interface |
| VBR | Variable Bit Rate |
| VCD | Virtual Connection Descriptor |
| VCI | Virtual Channel Identifier |
| VC | Virtual Circuit |
| VPI | Virtual Path Identifier |
| WAN | Wide Area Network |

FIG. 1 illustrates a conceptual digital communication network 10 embodying the present invention. The network 10 comprises an exemplary generalized portion 12, which is generally depicted as a cloud-like structure, and which optionally interconnects users both locally as well as across a wide area (i.e., nationally and internationally). The communication network 12 may effect this interconnection using a combination of various types of communication channels and links, such as public service telephone systems with local telephone twisted-pair wires, long-lines cables, fiber optic communication links, radio communication links, microwave communication links, cellular telephone systems, CATV cables, RGU cable, Direct TV links, and satellite links. It will be understood as well that other present and future types of communication channels and links may be included in the network 12.

The network 12 includes two exemplary sub-networks, each indicated with the numeral 12', and each of which is more localized. These sub-networks 12' may be at any arbitrary distance from one another. For example, the sub-networks 12' may be in adjacent buildings, in adjacent towns, or may be separated from one another by a great distance. The network 12 may include a great number of sub-networks, as is suggested by partial details depicted in FIG. 1. Each sub-network 12' may include a variety of information sources and information receivers. For example, the sub-networks 12' may include a local area network (LAN), indicated with the numeral 14. The network 12 may also include other data sources and receivers, such as private branch exchanges (PBX) 16 (i.e., telephone), main-frame or lower-scale computers 18, computer work stations 20, video signal sources 22 (i.e., a television or video camera), and video display devices 24 (i.e., a television or video monitor, for example).

Although not illustrated in detail in FIG. 1, the network 12 comprises a number of multi-protocol routers 26 (i.e., ATM interconnection devices) which are capable of interconnecting network nodes using a variety of conventional WAN protocols. ATM is a universal protocol which can be used for both WANs and LANs, as well as for other digital communication interconnections. As illustrated in the exemplary network 12, the network is connected through an ATM communication link 28 to an ATM termination device 30. The links 28 may connect the ATM interconnection devices 28 to the termination devices 30, and both may be called ATM switches. As is also seen in FIG. 1, the routers 26 may also connect the generalized network portion 12 (i.e., via the interconnection devices 26) to a number of other sub-networks (not shown, but suggested with the additional communication links 28). With respect to signal sources and signal receivers within a sub-network and which are communicating with one another, the termination devices 30 also serve as interconnection devices. Thus, as will be seen, the ATM switch devices 26 and 30, whether employed as a interconnection device (router) or termination device (which also may be considered a interconnection device with respect to the signal sources and receivers in that sub-network which communicate with one another, as suggested above) have much in common.

Figure 2:
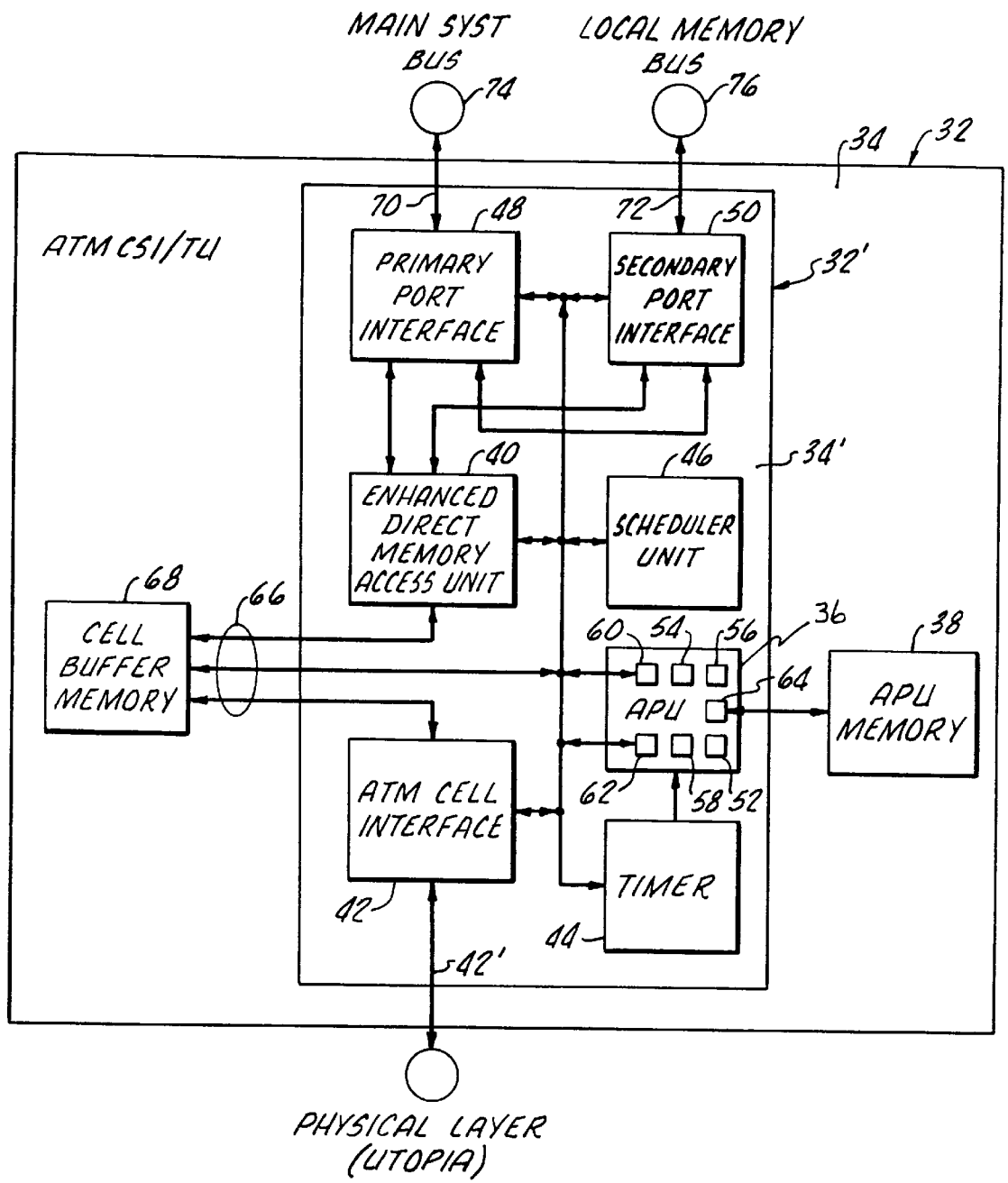
FIG. 2 is a diagram illustrating the organization of the main functional units of an ATMCSI/TU embodying the present invention.

Considering now FIG. 2, the architecture of a single-chip integrated circuit device 32, which is an ATM communication system interconnection/termination unit (ATMCSI/TU), is depicted. The ATMCSI/TU 32 may be used in an ATM switch of any kind, such as the interconnection devices (routers) 26, or the termination devices (ATM switches) 30, as described above. It will be understood that the uses of the ATMCSI/TU 32 are not limited to the example given above, and that the device may be used in a great variety of applications for ATM communications, as will suggest themselves to those ordinarily skilled in the pertinent arts. That is, the above example is exemplary only, and does not suggest a limitation on the invention.

The ATMCSI/TU device 32 is a single-chip unit which is designed to control almost all aspects of ATM communication operations from segmentation and reassembly of CS-PDU's and real-time data streams, to cell switching. Scatter-gather DMA, ATM layer operations, congestion control, statistics gathering, host <=> ATM device messaging, error monitoring, and diagnostic troubleshooting of the ATM port are all under control of the device 32. As will be seen, in addition to segmentation and reassembly operations, the single chip ATMCSI/TU 32 allows active and intelligent control of all aspects of ATM station operation (i.e., of a router 26 or ATM switch 30, for example). The provision of high speed processing capabilities at the port interface of the ATMCSI/TU 32 allows for the implementation of digital data communication systems delivering a level of operational control which can not be delivered on a cost-effective basis using conventional discrete implementations.

Operations Performed by the ATMCSI/TU 32

The ATMCSI/TU 32 is a single chip ATM network controller that fits into the segmentation-and-reassembly category of ATM control chips. The ATMCSI/TU 32 provides far more power and flexibility than is conventionally available from such segmentation-and-reassembly devices. The power of the ATMCSI/TU 32 comes from the inclusion within the chip of a user-programmable RISC central processing unit (referred to herein as a APU, or ATM processing unit). For this APU, user-selected firmware may be downloaded to the on-chip APU during a system reset, and controls most of the operational aspects of the ATMCSI/TU 32. That is, the APU 36 exercises executive control over the operations of most of the other elements in the ATMCSI/TU 32. Additionally, the ATMCSI/TU uses a dedicated coprocessor, referred to as an enhanced direct memory access (EDMA) unit to perform many functions under hardware control using memory-resident data structures. Segmentation and reassembly of CS/PDU's are likely to be two of the major tasks carried out by the ATMCSI/TU 32; but additional issues can be handled as well, including cell switching, VCI/VPI translation, statistics gathering, messaging and diagnostic operations. In addition, the way that a user's system manages CS-PDU lists (i.e. lists of CS-PDU's in need of segmentation), memory buffers (in scatter-gather implementations), Host-ATMCSI/TU messaging and other structures can vary from system to system depending on the software architecture implemented by the user. Accordingly, the APU is freed from doing repetitive data manipulation tasks, while these tasks are performed by a hardware implemented coprocessors using memory mapped data structures and linked lists of data. In a preferred embodiment of the present invention, full duplex 155 Mb/s performance is achieved.

The ATMCSI/TU 32—Functional Diagram

FIG. 2 illustrates that the ATMCSI/TU 32 is a single-chip integrated-circuit unit which is fabricated on a substrate 34. It will be seen that the ATMCSI/TU includes a core portion 34' of the substrate 34, which carries a core portion 32' of the ATMCSI/TU, and a peripheral portion (i.e. outside of the core 32') of this same substrate 34 which carries the associated memory facilities, as will be further explained. The ATMCSI/TU 32 provides ATM system designers with a segmentation-and-reassembly chip that can, through user firmware control, be used to implement ATM end stations (i.e., network terminations) and switching stations (i.e., network interconnections) in a number of different ways. As such the ATMCSI/TU 32 is a device that provides a number of critical hardware functions in combination with firmware control, and which are activated by the firmware which an ATM user downloads to the ATMCSI/TU 32's APU (to be described below) during a system reset interval.

As can be appreciated from the above, the ATMCSI/TU 32 is very flexible. Therefore, it is important to understand the functional blocks of the ATMCSI/TU 32. The ATMCSI/TU 32 consists of seven major on-chip core functional blocks, and two on-chip associated memory functions, as are illustrated in FIG. 2. The ATMCSI/TU incudes an ATM Processing Unit (hereinafter, "APU") 36. This APU 36 is an on-board 32 bit MIPS RISC-based central processing unit (CPU) which controls all aspects of operation of the ATMCSI/TU 32 in any particular operating environment. The APU 36 must process every incoming cell and generate every outgoing cell. The APU 36 provides the level of operational control necessary to support such functions as interleaved circuit termination (S&R) and cell switching of multiple ATM adaptation-layer-type cells, scatter-gather memory management operations, operation of intelligent congestion control algorithms, gathering of traffic statistics, and robust ATMCSI/TU-to-Host messaging.

APU 36 is interfaced with an on-chip APU memory unit 38, which will be further described below. ATMCSI/TU 32 also includes an enhanced direct memory access (EDMA) unit 40 with hardware support for AAL5, a master-and-slave UTOPIA level-2 multi-PHY ATM Cell Interface (i.e., input/output, or I/O) (hereinafter, "ACI") unit 42, (the interconnection being generally indicated with the numeral 42'), a timer unit 44 with multiple real-time timers, a scheduler unit 46, and both a primary port interface 48 and secondary port interface 50.

Considering the APU 36, this portion of the device 32 is preferably implemented using a 32-bit superscalar processor (i.e., a microprocessor, also generally referred to as a central processing unit or CPU) operating at 66 MHz, to deliver a performance of substantially 100 MPIS. This APU preferably includes six independent execution units, as follows. The APU includes an arithmetic logic unit 52, an load/store/add unit 54, a branch unit 56, a multiply/shift unit 58, a coprocessor interface unit 60, and a bus interface unit 62. Accordingly, the APU can issue and retire two instructions per clock cycle. APU 36 also includes a 64-bit wide cache and memory interface unit 64 allowing fetching of two instructions per clock cycle. The APU 36 provides all necessary signals to create within the APU memory 38 a direct-mapped instruction cache, direct-mapped data cache, scratch pad RAM, and an instruction memory RAM.

As is also seen in FIG. 2, the ATMCSI/TU 32 has interfaces at 66 (from the indicated internal structures and bus) to an on-chip cell buffer memory (CBM) 68. Hereinafter, particular memory locations and the contents of these particular memory locations of the CBM are referred to as "Buffers." That is, the memory locations and the memory contents are interchangeably referred to with this term. Also, the ATMCSI/TU 32 has respective interfaces at 70 and 72 between the PPI 48 and SPI 50 and a main system bus and local memory bus, indicated generally with the numerals 74 and 76, respectively.

The EDMA unit 40 is effectively a coprocessor under control of the APU 36. In other words, the EDMA is effectively a slave processor resource (as seen by the APU 36) and is utilized by the APU 36 under control of hardware registers and memory-resident data structures. Viewing now FIG. 3, a flow chart is presented which illustrates several typical cell flows in the ATMCSI/TU 32. Considering FIG. 3 on the left-hand branch (i.e. the reception side), it is seen at 78 that a cell is received from the Utopia interface. Responsively, the ACI 42 gets a free cell location, as is indicated at 80; and as is indicated at 82, builds a cell in Cell Buffer Memory 68. This completed cell is then placed in a reception FIFO memory location, as is indicated at 84. At the appropriate time, as indicated at 86, the ACI retrieves the completed cell from the reception FIFO memory location so that the APU 36 can check the cell header, as is indicated at 88.

Dependent upon the content of the cell header, the APU 36 then can make several possible dispositions of the completed cell. At 90 is indicated that the APU 36 may decide to discard the cell, and return the cell memory location to a free list. Alternatively, the APU 36 may issue a cell command, indicated at 92, so the EDMA 40 transfers the cell to a buffer memory location. Subsequently, the cell memory location may be returned to the free list either by the EDMA 36 (as is indicated at 96) or by the APU 36 (as was indicated at 90).

Figure 3:
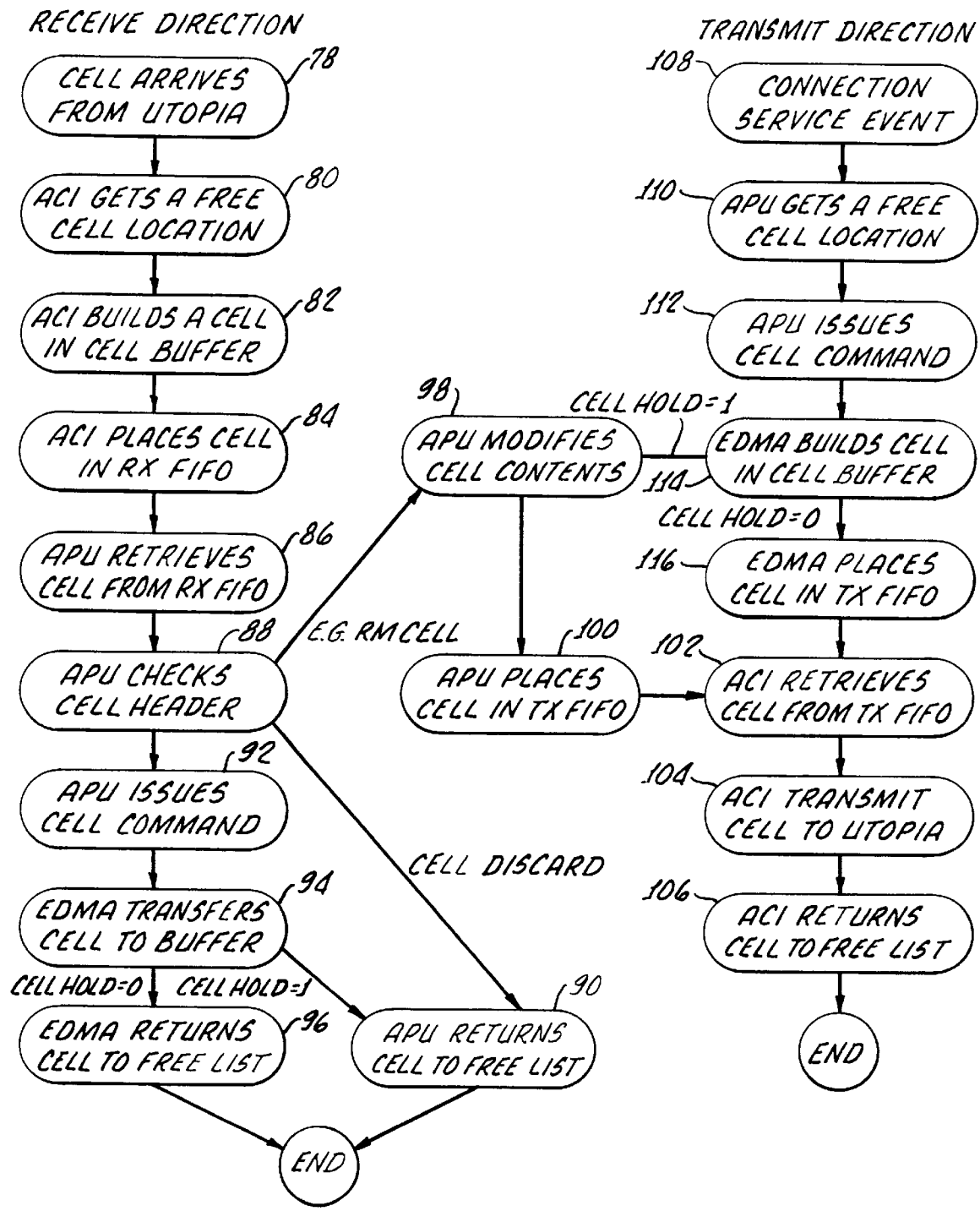
FIG. 3 is a diagram illustrating typical cell flow in an ATMCSI/TU embodying the present invention.

Returning to the decision point indicated at 88 on FIG. 3, when the APU 36 checks the cell header it may be indicated to prepare the cell for transmission. In this case, as is indicated at 98, the APU 36 then modifies the cell contents in preparation for transmission. Next, as is indicated at 100, the APU 36 places the cell in a transmission FIFO memory location. Subsequently, at the appropriate time the ACI 42 retrieves the cell from the transmission FIFO memory location (indicated at 102), and transmits the cell to the Utopia physical layer via the interconnection 42' seen in FIG. 2 (as is indicated at 104). Next, the ACI 42 returns the cell memory location to the free list.

Alternatively, a cell flow event may originate with an connection service event, as is indicated on FIG. 3 at 108. In this case, the APU 36 obtains a free cell memory location (indicated at 110), issues a cell command (indicated at 112), and the EDMA 42 builds a cell in Cell Buffer Memory 68 (indicated at 114). Dependent on whether the cell is to be held for future transmission or transmitted right away, the EDMA 42 may transfer control of the cell to the APU (as is indicated at 98), or may place the cell directly in the transmission FIFO memory location (indicated at 116). From the transmission FIFO location for the cell, the disposition of the cell through steps 102, 104, or 106 is the same as was explained above.

Data Structure Driven EDMA

Figure 4:
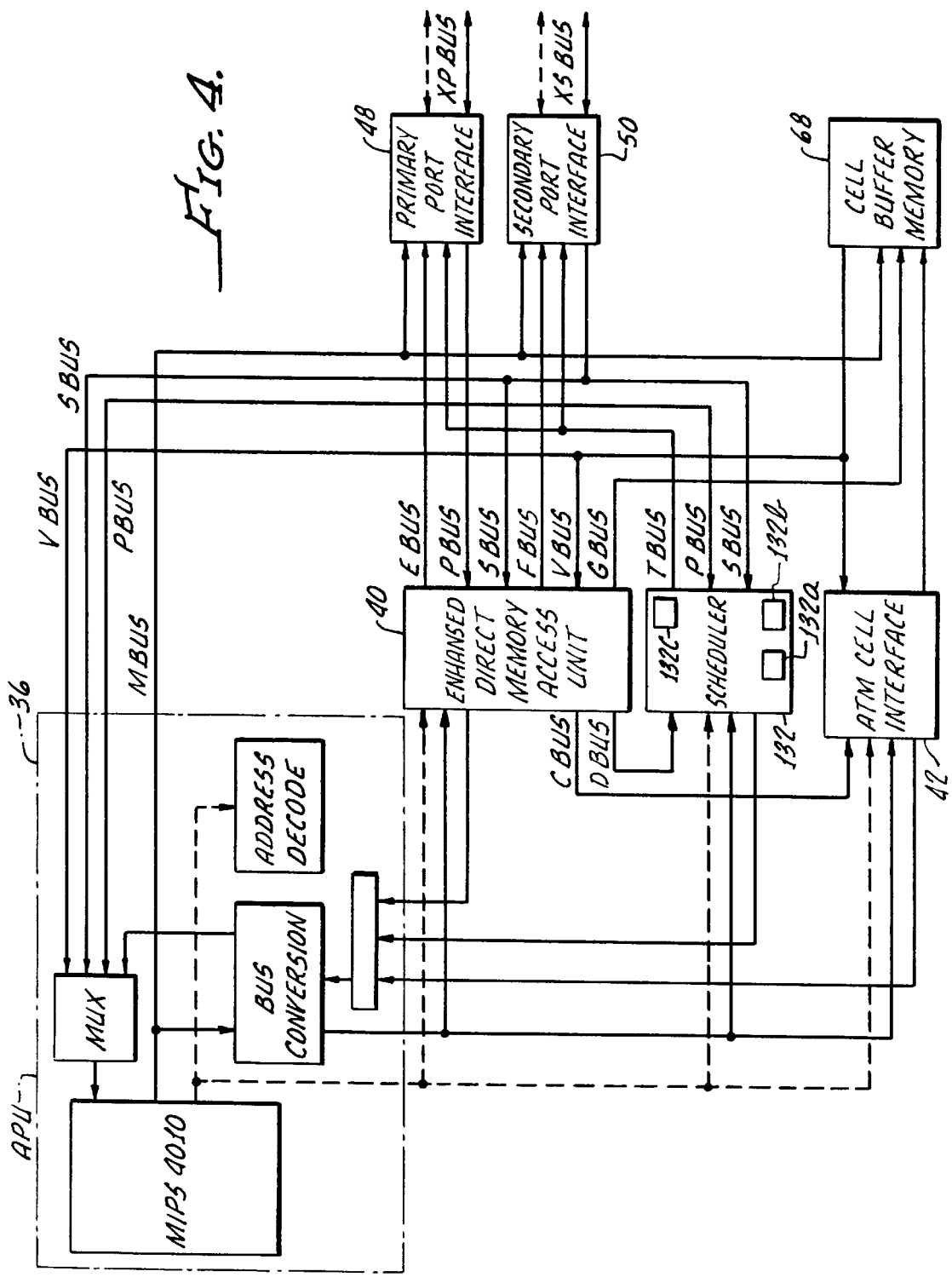
FIG. 4 is a hierarchical functional block diagram depicting the management relationship of a processor portion (APU) to an enhanced direct memory access (EDMA) unit of the ATMCSI/TU, and the relationship of the EDMA and APU to other functional features of the ATMCSI//TU.

At FIG. 4, a block diagram is presented of the architecture of the EDMA 40, and its interface with the APU 36, the CBM 68, and other elements of the ATMCSI/TU 32, as well as its interface and cooperation with other contextual devices of the ATMCSI/TU 32. In this depiction, solid line interface connections are for data, while dashed line interface connections are for addresses. It will be understood that the EDMA 42 may operate in three different modes, which are user-programmed using commands placed in an EDMA Request Que, and using memory-resident data structures. One mode is "DMA Modest" (i.e., direct memory access), in which the EDMA simply transfers a programmed number of bytes from a designated source address to a designated destination address. Another mode is "AAL0" (i.e., ATM Adaptation Layer 0), in which the EDMA performs partial segmentation and reassembly functions while transferring cell payloads between the CBM 68 and a memory location external to the ATMCSI/TU 32. Finally, the EDMA 42 may operate in mode "AAL5" (i.e., ATM Adaptation Layer 5), in which the EDMA performs as a complete AAL5 segmentation and reassembly (SAR) processor operating under tight control of the APU 36. Thus, the ATMCSI/TU 32 may be used to implement ALL1 and AAL3/4 functions as well, as will be apparent to those ordinarily skilled in the pertinent arts.

The following descriptions of the architecture, operation, and functioning of the ATMCSI/TU 32 are with respect to its operation in AAL5 mode. In the AAL5 mode of operation, the EDMA uses two memory-resident data structures to receive, process, and transmit CS-PDU's including data cells for virtual connections using linked lists. One of these memory-resident data structures is called "Virtual Connection Descriptor" (VCD), while the other is called "Buffer Descriptor" (BFD). Viewing FIGS. 5–9 in conjunction while keeping the architecture of FIG. 4 in mind, a diagrammatic depiction of the use of the Virtual Connection Descriptor and Buffer Descriptor is set out first in FIG. 5.

The Virtual Connection Descriptor is typically created by the APU 36 when a virtual connection is first established. A Buffer Descriptor is also created, keeps control information about a buffer memory locations used in maintaining the virtual connection, and is attached to the VCD when a Buffer (i.e., a memory location containing or to contain a CS-PDU) is segmented or reassembled. That is, a CS-PDU for a particular virtual connection may be placed in one or more Buffers. The BFD__Cont bit located in the control field of the BFD indicates that the CS-PDU payload is continued in a following Buffer, which is pointed to by "NextBFD field" in the Buffer Descriptor.

Figure 5:
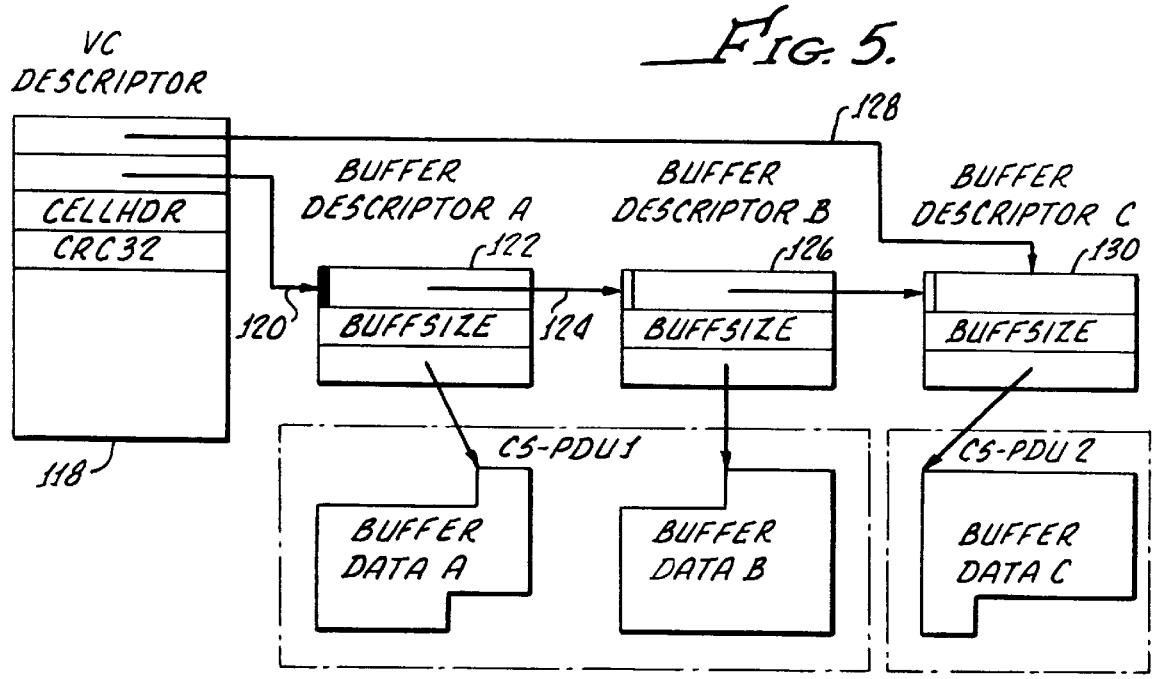
FIG. 5 is a diagrammatic illustration of memory-resident data structures used by the EDMA in processing CS-PDU's according to the present invention.

An example of this continuation of a CS-PDU payload from a first buffer memory location into another buffer memory location is seen in FIG. 5, where it is seen that the VC descriptor 118 for CS-PDU No. 1 points (as is indicated with the arrow and numeral 120) to a first (i.e., "A") BFD 122, which in turn points (as is indicated with the arrow and numeral 124) to a second (i.e., "B") BFD 126. These two BFD's 122 and 126 respectively point to Buffers (i.e., buffer memory locations in CBM 68, recalling FIG. 2) where the CS-PDU No. 1 is stored. In contrast, the CS-PDU No. 2 (for the same virtual connection) is stored in a single Buffer, as is indicated by arrow 128, and BFD (i.e., "C") 130. CS-PDU payloads are queued for segmentation on a particular virtual connection by attaching corresponding BFD's to the tail of the Buffer list. This operation is performed by the EDMA 40 when it receives an appropriate command from the APU 36.

Similarly, CS-PDU payloads are reassembled (i.e., the "reassembly" step of segmentation and reassembly (SAR)) in Buffers by the EDMA 40. When the APU instructs the EDMA to reassembly a cell belonging to a particular VC, the EDMA checks if there is enough space in the Buffer to store the cell payload. In case there is not enough space, the EDMA 40 attaches a Buffer from one of the two Free Buffer lists to the VCD. As will be seen, the APU may control the memory management (i.e., use of Buffer memory locations) by providing Buffers in advance of CS-PDU's for the EDMA to use as needed. The EDMA 40 always attempts to use Buffer provided in this way before linking to a new Buffer from the Free Buffer List. Thus, both an elaborated Buffer management via the APU, and a simple but fast Buffer management via the EDMA (i.e, hardware controlled) is supported.

More particularly viewing FIG. 6, it is seen that the Virtual Connection Descriptor (VCD) is a memory-resident data structure in the form of a 8×32 bit matrix (noting that some of the rows are repeated in this table dependent on the function being performed. At row 16 of this matrix, the VCD differs dependent upon whether it is for a received cell or a cell to be transmitted. In both cases, the VCD occupies eight words, and must be aligned to a 32 byte boundary. Row 20 depicts a similar variation in the VCD dependent on direction of cell movement. Following initialization of the VCD by the APU, the VCD is managed autonomously by the EDMA 40. As pointed out above, the VCD allows access of the BFD's and segmentation and reassembly of the CS-PDU's by the EDMA 40 using CBM 68 with Buffers therein (i.e., identified memory locations in the CBM 68 as needed).

FIG. 7 details the individual data fields of the VCD 118. The "Class" field stores the priority class of the VC (recalling the differing classes of connection services provided for differing types of ATM communications). The "Next VCD" field is used to chain VCD's in a linked list. Both these fields are used and maintained by the Scheduler Unit 46. The "IN bytes" field represents the number of bytes in the current Buffer to be processed.

For CS-PDU's moving in the transmit direction, the "N bytes" field represents the number of bytes still to be sent from the Buffer. As these bytes are sent, the EDMA decrements the Nbytes field and compares the remaining count to zero to check when a Buffer is completely segmented. The EDMA clears the Nbytes field when all data from the current Buffer is sent. For CS-PDU's moving in the received direction, Nbytes represents the number of bytes left free in the Buffer. The EDMA compares the value of Nbytes to the number of bytes in the current cell to check if there is enough space in the Buffer to store all of the CS-PDU payload (i.e., the data cell). If there is not enough space in the current Buffer, then the EDMA will attempt first to use a Buffer pointed to in the linked list next after the current Buffer. In the event that no such next Buffer is pointed to in a linked list structure (i.e., as part of the memory-resident data structure), then the EDMA attaches a Buffer from a Free Buffer List.

FIGS. 8 and 9 show that the BFD is also a memory-resident data structure, in the form of a 4×32 bit matrix. Each BFD occupies 4 words, and must be aligned with a 16 byte boundary. Hereinafter, the BFD is generally referred to with the numeral 122, recalling the description of FIG. 5, although the other BFD's 126 and 130 also comply with the general description for these data structures. The "BuffSize" field indicates the number of bytes in the Buffer. In the transmit direction of movement of CS-PDU's, the BuffSize field is set by the APU 36 in order to specify how many bytes of data are present in the Buffer. In the receive direction of movement of CS-PDU's, and for Buffers that are attached to VCD's in advance, the BuffSize field is set by the APU 36 to indicate the size of the Buffer. This field is ignored by the EDMA for Buffers taken from the Free Buffer list. The "NextBFD" field of the BFD contains the number of the following Buffer in a linked list structure, or a zero at the end of the list.

The "pBuffData" field is set by the APU 36 and is used by the EDMA 40 to find the beginning of the Buffer data payload. This field is never modified by the EDMA 40, it is copied to the VCD the first time the BFD is accessed so as to avoid having the EDMA make access to this field on a per-cell basis. Because the information is present in the VCD, the EDMA can go directly to the required Buffer location to obtain the data. The field called "ConNum" contains the connection number the BFD is attached to. In the receiving direction of CS-PDU movement, the EDMA builds this field when the Buffer is completed and before it is returned to the completion que in preparation for placing the cell in the reception FIFO, recalling FIG. 3. In the transmit direction of CS-PDU movement, either the APU 36 or the host system computer can set the ConNum field and the EDMA subsequently uses it to determine which VCD to attach the Buffer to.

EDMA Commands

The functional interface between the APU 36 and the EDMA 40 is implemented using memory-mapped registers. Requests for transfer or receipt of cells from a virtual connection, requests to attach a Buffer to a VCD, or to transfer data between source and destination locations are performed by the APU 36 writing commands to memory-mapped registers entitled, "EDMA_Cell, EDMA_ConNum, EDMA_Buff, and EDMA_Move. These requests are commands for the EDMA 40, and these commands are placed in the EDMA request queue. When a specific action is required of the APU 36, the EDMA places a message in the EDMA completion queue. The queues allow both APU 36 and EDMA 40 to operate in parallel, and prevent one from stalling the other while a response is awaited to a message or command. The EDMA places completed Buffers in the EDMA completion queue, and the APU 36 should empty the queue at a sufficient rate to prevent EDMA stalling. EDMA_Cell is used to put a cell service request in the EDMA request queue. The APU 36 will write the required connection number (i.e., the VC number) to the EDMA_ConNum register, and the cell address to the EDMA_Cell register. The second of these writing operations puts the entire contents of the registers in the EDMA request queue.

Similarly, an EDMA_Buff command is used to attach a BFD to a VCD for segmentation or reassembly of a CS-PDU. This command is placed in the EDMA request queue by the APU 36 by writing the Buffer number in the EDMA_Buff register. When the EDMA 40 receives a EDMA_Buff command from the EDMA request queue, it reads a Connection Number from the BFD and attaches the Buffer Descriptor at the end of the Buffer Descriptor list of the Connection. The EDMA_Buff command may be used for both transmit and receive virtual connections. For the transmit side of these operations, the linked list of BFD's is used by the EDMA to segment the CS-PDU into cells. For the receiving side of the operation, the presence of the EDMA_Buff command is optional because the EDMA will use storage area (i.e., memory locations) from the free buffer list, if no BFD's are attached to the VCD, recalling the above explanation.

The EDMA_Move command is used by the APU to cause the EDMA to perform a data transfer between source and destination address. The command is entered into the EDMA request queue when the APU writes a connection number (i.e., a VC number) to the EDMA_Move register (recalling that this is a memory-mapped location). The associated VCD is shown in FIG. 10. As can be seen viewing FIG. 10, this command is executed by the EDMA in DMA mode, and is performed while computing a crc32 checksum. The format of the VCD is changed as indicated in FIG. 10 compared to FIG. 6.

In view of the above, it is seen that the EDMA is a resource used by the APU 36 to complete tasks requiring only a few commands to be provided by the APU, and from which the EDMA will operate to complete the assigned tasks. The EDMA request queue allows the APU 36 to formulate and place requests for services from the EDMA in the EDMA request queue. While the EDMA is working on these or previous requests, the APU can be used under software control to perform other tasks. Thus, while the APU 36 is the "brains" behind ATMCSI/TU 32 operations, the EDMA unit 40 is the "muscle" behind such operations. Because the APU 36 initializes the EDMA unit 40 at the beginning of each operation, the EDMA unit 40 effectively supports an unlimited number of virtual connection channels.

The EDMA unit 40 is extremely powerful, supporting every combination of local and memory byte alignments on transfers. This powerful support of aligned and misaligned operations gives the ATMCSI/TU 32 an ability to participate in robust Scatter-Gather operations. The EDMA unit 40 is also responsible for generating crc32 results for AAL 5 SAR CS-PDU's. The EDMA unit 40 operates in 32 bit address and 32 bit data transfer mode.

Theory of EDMA Operation

The EDMA 40 is a unique SAR processor that executes a complex micro-coded program. Using pseudo-code, the functional flow chart for the EDMA 40 is considered in greater detail below. In order to simplify the description of EDMA operation, the explanation does not address the circumstance in which a CS-PDU payload is fragmented among multiple Buffers. The following pseudo-code flow charts are addressed to two differing operations for the EDMA 40, the first is conducted when a CS-PDU is transmitted, and the second when a CS-PDU is received. That is, the EDMA retrieves a VC Descriptor Number (ConNum) and a Cell Number (CellNum) from the EDMA Request Queue

| Transmit-Cell Processing Requests |
| --- |
| 1   read VC Descriptor |
| 2   if Aa15Trailer |
| 3     insert cell header with EOM |
| 4     clear cell bytes 4 to 45 |
| 5     place CS-PDU payload length in bytes 46–47 |
| 6     place final crc32 in bytes 48–51 |
| 7     send cell out |
| 8     clear Aa15Trailer bit |
| 9     delink current buffer |
| 10    return current buffer to Completion Queue |
| 11    if next buffer present |
| 12      install next buffer |
| 13    exit |
| 14  if no buffer installed |
| 15    exit |
| 16  N = min (48, Nbytes) |
| 17  transfer N bytes from buffer to cell and update Crc32 |

| Transmit-Cell Processing Requests |
| --- |
| —continued |
| 18  if Current Buffer exhausted |
| 19    if N > 40 |
| 20      insert cell header, no EOM |
| 21      clear rest of the cell |
| 22      send cell out |
| 23      set Aa15Trailer bit |
| 24    else |
| 25      insert cell header with EOM |
| 26      clear cell bytes till byte 45 |
| 27      place CS-PDU payload length in bytes 46–47 |
| 28      place final crc32 in bytes 48–51 |
| 29      send cell out |
| 30      delink current buffer |
| 31      return current buffer to Completion Queue |
| 32      if next buffer present |
| 33        install next buffer |
| 34  else |
| 35    insert cell header, no ECM |
| 36    send cell out |
| 37  update VC Descriptor |

© 1996, LSI Logic Corporation, Milpitas, California, USA.

Lines 2–13 address the situation in which all CS-PDU payload has already been sent. Lines 16 and 17 deal with transfer of the payload from a Buffer to the Cell Buffer Memory. Lines 20–23 handle the situation in which the CS-PDU trailer would not fit into the current cell. And lines 25–33 handle the situation in which the cell trailer does fit into the current cell, and an end-of-message (EOM) cell should be sent. Buffer Descriptors (BFD's) are not modified by the EDMA 40 for the transmit direction of CS-PDU processing. In particular, the Next_Buff field from the BFD returned to the EDMA completion queue may contain a pointer to a next BFD, which is invalid since the task will have been completed. However, processing time for the EDMA is saved by avoiding the step of modifying the BFD'S.

| Receive-Cell Processing Requests |
| --- |
| 1   read VC Descriptor |
| 2   if no buffer installed |
| 3     if buffer available |
| 4       install buffer |
| 5     else |
| 6       pull buffer from small buffer free list |
| 7       install buffer |
| 8   read cell header from Cell Buffer memory |
| 9   set N = 48 |
| 10  if an EOM cell |
| 11    read expected payload length from the cell |
| 12    if expected payload length different from accumulated |
| 13      return buffer with error status |
| 14  compute N (number of bytes in cell payload) |
| 15  read expected Crc32 |
| 16  if Number-Of-Bytes-In-BUFFER + N > Buffer Size |
| 17    delink current buffer |
| 18    return the current buffer in completion queue |
| 19    if next buffer available |
| 20      install next buffer |
| 21    else |
| 22      pull buffer from large buffer free list |
| 23      install buffer |
| 24  transfer N payload bytes to buffer |
| 25  if EOM cell |
| 26    update crc32 with padding and length |

-continued

Receive-Cell Processing Requests

| | |
|---|---|
| 27 | check crc32 against expected and set error codes |
| 28 | delink current buffer |
| 29 | return current buffer |

© 1996, LSI Logic Corporation, Milpitas, California, USA.

In this case, lines 2–8 process the case in which the cell received is the first cell of the payload and the receiving Buffer is not yet available. Line 8 is necessary in order to check whether the current cell is a continuation cell or an EOM cell. In line 9, the expected number of bytes to transfer is preset to 48 for a continuation cell. In case the EOM cell is received, the payload length and expected crc32 message are retrieved from the EOM cell, and the number of bytes transferred is computed based on the stated payload length. The expected payload length is compared to the accumulated length to check for lost cells.

Free Buffer Lists

The EDMA 40 maintains two memory-resident lists of free Buffers and uses the CBM for this purpose. One of these lists is called the Small Buffer free list, and the other is the Large Buffer free list. Buffers from these lists are used in the cell-reception direction of CS-PDU processing if the CS-PDU needs to be reassembled and there is no space in the current Buffer or no Buffer is attached (recalling the VCD description above). A Buffer from the Small list is used at the beginning of the CS-PDU. In the event the additional Buffers are required, then they are taken from the Large list. After use, the Buffers are returned by the EDMA to a free list using a null Connection number. The EDMA examines the "BuffSel" bit in the BFD_Ctrl field of the BFD to determine which buffer list should be used at a particular time.

In the free buffer lists a just-freed Buffer is always inserted at the beginning of the free list, and will consequently be the first Buffer selected for reuse. This arrangement is different than the case when a Buffer is attached to a VCD in which case the it is appended to the end of a linked list. However, appending the Buffer to the end of a linked list requires two pointers, one for the head end of the list and one for the tail end. In the case of Free Buffers, the list order is not important and one pointer can be eliminated by use of the above methodology.

In view of the above, it is appreciated that the EDMA 40 is controlled using hardware registers and memory-resident data structures. A command is written to the EDMA request queue by the APU by writing either to the EDMA_Cell, EDMA_Move, or EDMA_Buff registers. The address to which the writing operation is conducted determines how the written data is interpreted by the EDMA 40. Subsequently, the EDMA retrieves commands from its request queue, and executes these commands in order. When the APU places a service request in the EDMA request queue, the message consists of a VCD number, of a VC that needs to be serviced, and an address of a cell in the Cell Buffer Memory 68 (in the case of an EDMA_Cell command). The cells moving in the received direction, this is the address of a received cell.

For cells moving in the transmit direction, the address provided is for a free location of Buffer Memory where a cell may be assembled by the EDMA. In each case, the EDMA computes the address of the VCD, reads the VCD to retrieve the necessary control information (i.e., recalling the BFD's referred to in the VCD), and transfers the data between the source and destination addresses. The VCD is updated by the EDMA to indicate that the task has been completed. For cells moving in the transmit direction, the EDMA may also optionally place the cell in the TX Fifo memory of the ACI.

Further, for AAL5 EOM cells, the APU typically needs to conduct house keeping activities, such as informing the host system computer that the CS-PDU transfer has been completed. To enable this particular house keeping function, the EDMA stores the Buffer number of the just completed Buffer in the EDMA completion queue. Both the request queue and completion queue for the EDMA are hardware-managed, and can hold up to four entries. The EDMA supports CS-PDU's which are not located in contiguous locations of memory (i.e., for scatter-gather operations).

Importantly, for Buffer management (i.e., management of cell buffer memory resources), the EDMA is able to proceed sequentially through a linked list of BFD's. Completely processed Buffers are returned to the EDMA completion queue, while the Buffers to be processed are retrieved from the EDMA request queue and are attached to the tail end of the linked list of Buffers. Direct memory access transfers (i.e., DMA mode) are performed when the APU places a move command in the EDMA request queue (i.e., an EDMA_Move command).

When a specific action is required from the APU following completion of a command, the EDMA will place status information in the EDMA completion queue. An example of such a completed status information is an entry for completion of a Buffer chain transmission. Another status entry may indicate that the last cell of a received CS-PDU has been DMA'ed (i.e., processed by the EDMA and stored in Buffer memory), or that a Buffer has been attached to an idle VCD.

ATM System Cell Flow Control—A Time Management Team—The Timer Unit 44 and Scheduler Unit 46

As pointed out above, the ATM system provides for a variety of classes of service. That is, audio, video, and file transfer services do not require the same class of service. In this respect, flow control of CS-PDU's in the ATM system is related to the process of cell segmentation. The flow control questions to be answered at any particular moment of time are which one of the possibly thousands of VC's being services should be serviced next, and whether the selected VC has the right to send a cell given the state of the network. For purposes of insuring inter-operability of devices used to construct ATM systems, an algorithm presently in existence is standardized. The primary rate-based algorithm used to make this flow control decision is standardized by the Traffic Management working sub-group of the ATM Forum. A second credit-based algorithm is also being developed by an industry consortium.

The credit-based algorithm is not yet an industry standard. The rate-based algorithm did not exist a few years ago, so conventional technology devices could comply with these algorithms (if at all) only by using resident processing capabilities under software control to do the entire job of executing the algorithms. In this case, the performance of conventional technology ATM devices is severely restricted because the resident processing capability is occupied too much of its time with tasks having to do with this software-implemented flow control.

The time management team of the ATMCSI/TU 32 includes the scheduler unit 46 and timer unit 44, which units function both individually and together, and under control of the APU to control CS-PDU traffic in the ATMCSI/TU 32. The time management algorithms are moderated or executed by the APU 36. But this APU uses the facilities of the time management team (i.e., the scheduler unit 46 and timer unit 44) to do a great deal of the time consuming tasks involved in scheduling, as will be further explained. Consequently, the APU 36 can devote its processing resources to other tasks while the time management team is working. Further, when the credit-based or other future algorithms become industry standards, they can be easily programmed into the ATMCSI/TU 32. That is, these algorithms will still be moderated or executed by the APU 36 under software control, but will still be executed at a much faster rate than any conventional technology device could do so because the tasks will still be shared by the time management team described in greater detail below.

The scheduler unit 46 uses a memory (i.e., APU memory 38, CBM 68, or another memory resource) to manage a calendar-based schedule table, and is mainly used for CS-PDU traffic on an available-bit-rate basis. Timer unit 44 includes a set of hardware timers, and is mainly used to shape the CS-PDU cell traffic of the constant-bit-rate type. Both the scheduler unit 46 and timer unit 44 may be used together by the APU 36 to control variable-bit-rate traffic.

Scheduler Unit 46

Viewing FIGS. 11a and 11b together, these Figures respectively show a block diagram of the scheduler unit 46, and a data path diagram for this scheduler unit 46. This scheduler unit 46 may be used to create arbitrary traffic schemes on a large number of VC's. The scheduler unit 46 manages a memory-resident calendar table, which will be further explained below. Each entry in the calendar table corresponds to one cell slot and holds a list of VC's that need to be serviced in that slot. The pointer to the current slot is kept in an internal register called "SCD_Now" (indicated on FIG. 11 with numeral 132, and also seen in FIG. 4). In FIGS. 4 and 11, the sub-parts of the register 132 are indicated with numerals 132a, 132b, and 132c. This scheduler unit 46 has two modes of operation, one called Flat Rate mode, and the other Priority Mode. In the Flat Rate mode, the calendar table holds pointers to both the head and tail end of the linked list containing the VCD's scheduled for a particular slot. In Priority mode, the calendar table holds only the head end pointer of the list. In each mode of operation, the scheduler 46 keeps internal copies of these pointers for the current cell slot. When operating in Flat Rate Mode, the scheduler unit 46 needs to keep four sets of head and tail pointers (indicated on FIG. 11 with the numerals 134 and 136, respectively) because there are four classes of priority. The first set of head end and tail end pointers are used by the scheduler unit 46 in the Flat Rate mode of operation.

Along with the head end and tail end pointers, the scheduler unit 46 also keeps the "Class" (indicated with numeral 138) and present Buffer identification for the current VCD (indicated on FIG. 11 with "Next/Previous, and the numeral 140). "Class" is used to attach the presently un-serviced VCD list to the linked list of the next sequential cell slot at the appropriate place. "Class" is also used to schedule the VC last serviced for service again before other connections are serviced. The identification information for the present Buffer is returned to the APU 36 along with the connection number (VC number) to be serviced.

Schedule Commands

When the APU 36 writes a connection number (VC number) and the cell slot number to the "SCD_Sched" register, the scheduler unit 46 (if in priority mode of operation) scans the linked list of VCD's at the specified slot number and places the just-written VCD at the appropriate location in the linked list. In the event that the scheduler unit 46 is operated in the Flat Rate mode, then the scheduler unit merely appends the given VCD to the end of the linked list. In order to facilitate these activities, the scheduler unit 46 uses two more internal registers, called "NextHead" (indicated with numeral 142) and "PrevTail" (indicated with numeral 144). Also, the scheduler unit uses registers called "SchdClass" (indicated with numeral 146) and "NextClass" (indicated with numeral 148) to hold the class information respectively for the VC it is trying to schedule and for the VC it reads during scanning.

However, before starting to scan the linked list of VCD's, the scheduler unit 46 checks the given connection number (VC number) for zero value. If the zero value is found, the scheduler unit 46 uses the connection number stored in register called Last_Serv (indicated with numeral 150), and the Class" information stored in a register called "LastClass" (indicated with numeral 152). If the zero value is not found, then the scheduler 46 makes a request over a bus identified with the characters "Tbus" and the numeral 154 (originated by a state machine of the same name, as will be explained) to obtain the first word of the given VCD. The returned class value (i.e., VCD bits [17:16]) are stored in the SchdClass register. Thereafter, scheduler 46 scans through the linked list, every time storing the connection number in the NextHead register 142, and class information in the NextClass register 148, until it reaches a point where the given VCD may be placed.

The following pseudo code illustrates the command execution flow of the "Schd_Schd" state machine (indicated with the numeral 156). Each load or store operation interacts with a state machine called Tbus (indicated with numeral 158) having control over the Tbus request, and proceeds only after the Tbus request and answer transaction is concluded:

```
1   function_schd();
2   begin //function_schd
3     if (connection != 0)
4       schdClass <= VCD[connection].class
5     else begin
6       connection <= last_serv;
7       schdClass <= lastClass;
8     end
9     if (priMode) begin
10      nextHead <= cal[slot].head;
11      if (nextHead != 0) begin
12        nextClass <= VCD[nextHead].class;
13
14        if (schdClass < nextClass) begin
15          Cal[slot].head <= connection;
16        end
17
18        if (schdClass > nextClass) begin
19          while ((schdClass != nextClass)&&next
                Head !=0) begin
20
21            prevTail <= nextHead;
                nextHead <= VCD[nextHead].next;
22            if (nextHead != 0)
23              nextClass <= VCD[nextHead].class;
24            else VCD[prevTail].next <=
                  connection; //list terminates here
25          end
26      end //this Will always fall through into next
          clause
27        //except for the case when the list is
            exhausted
```

```
28
29      if (schdClass == nextClass) begin
30        while ((schdClass==nextClass) && next
          Head !=0) begin
31          prevTail <= nextHead;
32          nextHead <= VCD[nextHead].next;
33          if (nextHead != 0)
34            nextClass <= VCD[nextHead].class;
35          end
36          VCD[prevTail].next <= connection;
          //for both > and == cases
37        end
38
39      VCD[connection].next <= nextHead; // for all
        three cases
40      end
41    else begin
42        cal[slot].head <= connection;
43        VCD[connection].next <= 0;
44    end
45  end
46  else begin // flat mode
47    prevTail <= cal[slot].tail
48    if (prevTail != 0) begin
49      VCD[prev.Tail].next <= connection
50      cal[slot].tail <= connection;
51    end
52    else begin
53      cal[slot].head+tail <=
        connection+connection;
54    end
55    VCD[connection].next <= 0;
56  end
57  end //function_schd
```

© 1996, LSI Logic Corporation, Milpitas, California, USA.

Service Commands

Scheduler unit 46 includes another state machine called "Schd_Serv. When the APU 36 requests a reading of the SCD_Serv register of the scheduler, the scheduler returns the first non-zero head end linked list pointer from O to 3. If all four linked list head end pointers are zero, then the scheduler unit 46 returns a zero value to the APU 36 signifying the no connection is available for service. In case the scheduler unit 46 is operating in Flat Rate mode, it needs to check only the first linked list head end pointer. At the same time, the scheduler unit 46 saves this connection number for the VC last serviced in the internal register Last_Serv 150. Once the APU 36 request for a reading of last scheduled VC serviced is completed, the scheduler unit 46 initiates a 2-word burst transaction on the Tbus 154 to read the first two words of the VCD just returned to the APU. Scheduler unit 46 then uses these two words to update the head end pointer last returned to the APU 36 (i.e,. the contents of registers 150 and 152.

The following pseudo code illustrates the command execution flow of the Schd_Serv state machine (indicated with the numeral 156):

```
1   function_serv ();
2   begin //function serv
3   if (head0 != 0) begin
4       SCD_serv <= head0);
5       head0 <= VCD[head0].next+class+buffPres;
6   end
7   elseif (PriMode) begin
8       if (head1 != 0) begin
9         SCD_serv <= head1;
10        head1 <= VCD[head1].next+class+buffPres;
11      end
12      elseif (head2 <= 0) begin
13        SCD_serv <= head2;
14        head2 <= VCD[head2].next+class+bufferPres.
15      end
16      elseif (head3 != 0) begin
17        SCD_serv <= head3;
18        head3 <=
          VCD[head3].next+class+bufferPres;
19      end
20      else SCD_serv <= 0;
21    end
22    else SCD_serv <= 0;
23  end //function_serv
```

© 1996, LSI Logic Corporation, Milpitas, California, USA.

Tic Commands

Scheduler unit 46 includes yet another state machine called "Schd_Tic/Now. When the APU 36 writes a command to the SCD_Tic register, the scheduler unit 46 accepts the request if another Tic command is not already in service or posted to be serviced. A word transaction on Tbus 154 is initiated to reset the head and tail end pointers (i.e., registers 134 and 136) for the current slot pointed to by the Now index in the calendar table (i.e., the content of register 132). The scheduler unit 146 increments the Now pointer to point to the next cell slot entry in the calendar table. After this incrementing of the Now pointer, the scheduler unit 146 scans through the linked list at the new cell slot to identify sections for each priority class. The un-serviced list of VCD's of the previous slot is attached at the appropriate location of the linked list according to class, and the pointers are updated in this scanning process. Next_Head (142), Previous_Tail (144), and Next_Class (148) register entries are used to scan through the new linked list organization. In priority mode of operation for the scheduler unit 146, this reorganizing of the linked list in a cell slot may require many Tbus word transactions depending on the length of the linked list. For the Flat Rate mode of operation, the scheduler unit 146 only updates the head "0" and tail "0" pointers. Scanning the entire linked list is not necessary in Flat Rate mode because the head and tail pointers are both available in the registers 134 and 136.

The following pseudo code illustrates a Tic command execution flow of the Schd_Tic/Now state machine (indicated with the numeral 162). Each load or store operation interacts with the Tbus state machine 158 and proceeds only after the Tbus word transaction is completed. In the Priority mode of operation, the scheduler unit 146 may require several Tbus transactions before a Schd_Tic command is fully executed:

```
1   function tic ();
2   begin //function_tic
3   if (flatMode) cal[now].head+tail <= 0;
4   else cal[now].head <= 0;
5   now = now+1;
6   if (now > SCD_CalSize)
7       now <= now - SCD CalSize;
8   function_scan ();
9   end //function_tic
10
11  function_scan ()
12  begin //function_scan
13  nextHead <= cal[now].head;
14  if (priMode) begin
15    if (nextHead != 0) begin
16      nextClass <= VCD[nextHead].class;
17
18      if (nextClass == 0) begin
19        if (head0 == 0)head0 <= nextHead;
20        else VCD[tail0].next <= nextHead;
```

```
21        while (nextClass == 0 && nextHead !=
       0) begin
22          prevTail <= nextHead;
23          nextHead <= VCD[nextHead].next;
24          if (nextHead != 0)
25             nextClass <= VCD[nextHead].class;
26        end
27        tail0 <= prevTail;
28      end
29    end
30    if (nextClass == 1 && nextHead != 0) begin
31       if (head1 == 0) head1 <= nextHead;
32       else VCD[tail1].next <= nextHead;
33       while (nextClass == 1 && nextHead !=
       0) begin
34          prevTail <= nextHead;
35          nextHead <= VCD[nextHead].next;
36          if (nextHead != 0)
37             nextClass <= VCD[nextHead].class;
38        end
39        tail1 <= prevTail;
40      end
41    end
42    if (nextClass == 2 && nextHead != 0) begin
43       if (head2 == 0) head2 <= nextHead;
44       else VCD[tail2].next <= nextHead;
45       while (nextClass == 2 && nextHead !=
       0) begin
46          prevTail <= nextHead;
47          nextHead <= VCD[nextHead].next;
48          if (nextHead != 0)
49             nextClass <= VCD[nextHead].class;
50        end
51        tail2 <= prevTail;
52      end
53    end
54    if (nextClass == 3 && nextHead != 0) begin
55       if (head3 == 0) head3 <= nextHead;
56       else VCD[tail3].next <= nextHead;
57       while (nextClass == 3 && nextHead !=
       0) begin
58          prevTail <= nextHead;
59          nextHead <= VCD[nextHead].next;
60          if (nextHead != 0)
61             nextClass <= VCD[nextHead].class;
62        end
63        tail3 <= prevTail;
64      end
65    end
66  end
67 end
68 else begin
69    if (head0 == 0)head0 <= nextHead;
70    else VCD[tail0].next <= nextHead;
71    tail0 <= cal[now].tail;
72 end
73 end //function_scan
```

©1996, LSI Logic Corporation, Milpitas, California, USA.

Further to the above, when the APU 36 writes a command to the SCD_Now register 132, the scheduler unit 46 also accepts this command if there is not other Tic or Now commands in service or posted for service. The Now and Tic commands are serviced both by a single state machine (i.e., the Schd_Tic/Now state machine 162) because they serve very similar functions. In response to a Now command, the scheduler unit 46 needs to update the calendar table for the current cell slot with the pointer information it has stored internally in registers. Next, the scheduler unit 46 scans the new VC list. In Flat Rate mode, the scheduler unit 46 simply stores the current "0" tail end and head end pointers in the calendar table entry.

If the scheduler 46 is in Priority mode, it scans the head and tail end pointers (registers 134 and 136) and updates the calendar table at the same time, linking the last VCD of each successive non-empty linked list to the first VCD of the next linked list. After this task is completed, the new slot value is transferred to the "NOW" register. Then the scheduler unit 46 scans through the linked list at the new cell slot to identify sections for each priority class. The un-serviced list of VCD's of the previous slot is attached at the appropriate location of the linked list according to class, and the pointers are updated in this scanning process. Next_Head (142), Previous_Tail (144), and Next_Class (148) register entries are used to scan through the new linked list organization. The following pseudo code illustrates a Now command execution flow of the Schd_Tic/Now state machine (indicated with the numeral 162). Each load or store operation interacts with the Tbus state machine 158 and proceeds only after the Tbus word transaction is completed. In the Priority mode of operation, the scheduler unit 146 may require several Tbus transactions before a Schd_Now command is fully executed:

```
1   function_now
2   begin //function now
3   if (flatMode) begin
4      cal[now].head+tail <= head0+tail0;
5   end
6   else begin
7      if (head0 != 0)cal[now].head <= head0;
8      else if (head1 != 0) cal[now].head <= head1;
9       else if (head2 != 0) cal[now].head <=
          head2;
10        else if (head3 != 0) cal[now].head <=
          head3;
11
12   if (head0 != 0) begin
13      if (head1 != 0) VCD[tail0].next <= head1;
14      else if (head2 != 0) VCD[tail0].next <=
          head2;
15        else if (head3 != 0) VCD[tail0].next
          <= head3;
16          else VCD[tail0].next <= 0;
17
18   if (head1 != 0) begin
19      if (head2 != 0) VCD[tail1].next <= head2;
20      else if (head3 != D) VCD[tail1].next <=
          head3;
21        else VCD[tail1].next <= 0;
22
23   if (head2 != 0) begin
24      if (head3 != 0) VCD[tail2].next <= head3;
25      else VCD[tail2].next <= 0;
26   end
27   now <= Scd_now;
28   function_scan ();
29   end //function_now
```

©1996, LSI Logic Corporation, Milpitas, California, USA.

Timer Unit 44

FIG. 12 provides a functional block diagram of the timer unit 44. The timer unit 44 implements a set of hardware timers to provide the APU 36 with real-time events. The timer unit 44 includes a 32-bit time-stamp counter 164, seven 8-bit general purpose timers (indicated with the numeral 166, seven 8-bit timer initialization registers 168, a 32-bit timer clock selection register 170, a time-out enable register 172, and a time-out clear register 174. Both the time stamp counter 164 and the general purpose timers have programmable input clocks as well as their count enables. An input clock may be either an external clock or the system clock. Counting by these timers may be enabled always or in response to a time-out event of another general purpose timer. This latter feature allows the timers 166 to be cascaded under control of APU 36 so that wider counts (i.e., longer time intervals) my be achieved. A time-out event is registered in a status register 176 which is available to the APU 36, or a time-out event may optionally generate an interrupt or raise a flag for the attention of the APU 36.

Timer Clock Selection

All timers 166 have their input clock and the count enable programmable by the APU 36 using the register 170. The 32-bit register 170 is divided into eight 4-bit wide bit fields. Bit field 0–3 corresponds to the time stamp counter 164, while bit field 4–7 corresponds to the general purpose timer No. 1. Each successive 4-bit field corresponds to the next successive one of the seven general purpose timers 166. The MSB of each 4-bit field specifies the clock that is used for the particular timer or counter. A "0" in this position specifies the system clock, while a "1" selects the external clock. The next 3 bits of the bit field specify the event that is used to decrement the corresponding general purpose timer or to increment the time stamp counter. A timer is decremented at each input clock event, while the event is programmed using the corresponding bits of the register 170. When a timer reaches "0", it is timed out, and is then reloaded with the content of the timer initialization register 168. All of these timers and registers are accessible to the APU 36 using memory-mapped registers 168, 172, and 174. The time-out events are registered in the status register 176, and may generate an interrupt or other message for the APU 36, as was noted above.

Time Stamp Counter

The time stamp counter is a 32-bit counter that increments at each clock event. An input clock event is programmed by the APU 36 using the register 170. This timer times-out when it reaches its maximum value, and is then reset to zero. The time out event for this timer is registered in register 178, and may also generate an interrupt or raise a flag for the APU 36. This time stamp counter 164 may be read by the APU 36 using the memory-mapped register 178.

As was pointed out above, the EDMA 40 maintains two lists of Buffers, a Small free buffer list and a Large free buffer list, unless it is instructed by the APU 36 under software control to use a different memory management scheme. If the EDMA is not so instructed under software control, it will use its own two-list scheme of memory management, and will require only minimal processing attention from the APU 36. In this event, processing time requirements for the APU 36 can be used for other purposes, and the speed of the ATMCSI/TU 32 is improved. Those ordinarily skilled in the pertinent arts will understand that a fundamental problem for ATM protocol (i.e., SAR engines), such as the ATMCSI/TU 32, is the requirement to support a large number of virtual circuits (VC's). Such VC support requires use of memory Buffers for both segmentation and reassembly of CS-PDU cells. If Buffers are pre-assigned to virtual circuits ahead of the time for their use, then many of the Buffers may actually be empty at any particular time, and large amounts of memory space will be empty and wasted.

The ATMCSI/TU 32, by operation of the EDMA 40 and CBM 68, and with minimal involvement from the APU 36 in the default condition, effects an efficient hardware-implemented Buffer memory management scheme. If greater involvement of the APU 36 is desired, then a software-implemented and user-selected Buffer memory management scheme can be used. Of course, the software implemented scheme uses some of the processing time from APU 36.

The efficient Buffer memory management scheme does not pre-assign memory Buffers to particular VC's. Instead, the EDMA maintains the Small and Large Buffer lists, as explained above. When a virtual circuit becomes active, the EDMA gets a free Buffer from one of the two lists and uses this and subsequent Buffers to support the segmentation and reassembly tasks for CS-PDU's. The two lists are created and maintained under software from the APU 36, so that they need not be static structures occupying memory. Alternatively, a user of the ATMCSI/TU 32 may select a user-programmed memory management scheme of their own devising. In this case, the allocation of Buffers and amount of memory space required will depend on the ingenuity of the programmed management scheme.

Cell Buffer Memory 68

FIG. 13 provides a block diagram of an interface 180 for the CBM 68. The CBM function itself includes this interface 180 of the ATMCSI/TU 32 and a RAM memory unit (identified below) external to the core 32' of the ATMCSI/TU 32 (as is indicated in FIG. 1). Up to 16 Kbits of Ram memory may be used with the ATMCSI/TU 32 to form the CBM unit 68. Memory cycles are arbitrated on a clock by clock basis. A priority access scheme is enforced, giving the ACI 42 highest priority, followed by the APU 36, and EDMA 40, in that order. When one of these units (i.e., ACI 42, APU 36, or EDAM 40) needs access to the CBM 68, it provides a request signal. The ACI 42 receives immediate access to the CBM 68 in response to such a request. The APU 36 and EDMA 40 will receive a signal indicating access to the CBM 68.

Considering FIG. 13, it is seen that the CBM interface 180 includes an arbitrator 182, which on respective memory access request lines indicated with numeral 184, may receive access request signals, indicates as "aci_rq" for a request from the ACI 42, with "Mrqc" for a request from the APU 36, and with "Grqv" for a request from the EDMA 40. As pointed out above, these requests result in grants of memory access in accord with the priority order described above. Signal lines from arbitrator 182 and indicated with the numeral 186 carry signals indicated as "CMBRDY" for granting the APU 36 memory access, and as "GBRDYN" for granting EDMA 40 memory access.

A memory-write enabler 188 grants immediate access to an ACI request via signal line 190, so that a memory write enable signal received from the ACI (as signal "aci_wr [3:0])" is passed immediately to RAM memory 194. The write-enable signal from APU 36 (signal "sctben[3:01])", and from EDMA 40 (signal "gtben[3:01]") will be issued in response to granting of memory access to these devices. Data to be written into the memory 194 is received on lines 196, respectively as signals "aci_dop[31:0]" for the ACI 42, as "mdop[31:0]" for the APU 36, and as "gdop[31:0]" for the EDMA 40. Switch 198 directs the data to be written to memory 194. Similarly, the addresses to which the data is to be written are received via lines 200 and switch 202 as signals "aci_adrop[11:0]" for the ACI 42, as "maop[11:0]" for the APU 36, and as "gadrop[11:0]" for the EDMA 40. A line 204 carries data output of RAM memory 194, when the access request is for a memory data read.

Linked-List Implementation of a Fifo Memory for an ATM SAR Cell Buffer

Turning now to FIG. 14, a more detailed depiction of the ACI 42 is provided. It is seen in FIG. 14 that the ACI 42 includes an ACI transmitter portion 206, and an ACI receiver portion 208. The ACI 42 is responsible for transferring cells between the Cell Buffer Memory 68 and the Utopia port (recalling interconnection 42' depicted in FIG. 1). The Utopia port is compliant to the Utopia level 2 multi-PHY specifications (version 1.0). For transmitting cells, the ACI retrieves cells built in the CBM 68 by the EDMA 40 or APU 36, and sends them one byte at a time to a selected Physical layer device of the ATM 10. For receiving cells, the ACI determines which of the PHY level devices should be serviced in the current cell slot time interval according to the prevailing programmed priority scheme, and receives a cell from this source byte by byte. The received cell bytes are placed in the CBM 68 for further processing by the EDMA 40 or APU 36.

The ATMCSI/TU 32 may act either as a master or a slave on the Utopia bus (i.e., interconnection 42 of FIG. 1). Cells for both the transmit and receive directions of cell movement are stored in CBM 68. In the CBM 68, the ACI 42 creates and maintains a pair of FIFO memory areas. These FIFO memory area are used in ATM SAR in order to decouple (in the time sense) the traffic of the system memory 68 (which tends to be carried out in bursts) from the constant (or more nearly so) data traffic rate of the transmission medium (i.e., the ATM system 10 outside of the ATMCSI/TU 32.

ACI 42 also includes a Cell Buffer Manager (CBMa) 210, which is a hardware implemented memory manager responsible for managing the Free Cell Lists as well as the Transmit and Receive FIFO's explained above. It will be recalled that this CBMa of the ACI 42 has access to the CBM 68, as was described above. This CBMa 210 is also responsible for managing a Transmit Error FIFO memory in CBM 68, and contains the ACI memory-mapped registers and APU interface.

Considering now FIG. 15, and recalling the descriptions above of the VCD's and BFD's, it will be seen that in the preferred embodiment of the invention, ATM cell data, also referred to as the elements are kept in memory organized as a First-In-First-Out (FIFO) queue using linked-list data structure, and pointers to the first element of the FIFO queue, the last element of the FIFO queue, and to the first element of the list of the unused free cells are kept in registers of the CBMa 210. When there are multiple memory segments, which are also referred to as data cell elements, the registers within the CBMa may point to the first and the last elements or each of the elements stored in memory. In the present preferred embodiment, the CBMa maintains a pointer to the first element and a pointer to the last element, and a pointer to the second and each subsequent element is stored within each previous element of the linked-list. Also, the last element in the list contains a special pointer value referred to as the null value or 0.

FIGS. 15a–15e illustrate the basic operations of a FIFO queue implemented as a linked-list. In particular, FIG. 15a shows the first element pointer (FEP) 212 and the last element pointer (LEP) 213 in their initial state. FIG. 15b shows the state of the FEP 212 and the LEP 213 pointers after one cell element has been added to the FIFO memory. In that Figure, please note that both FEP 212 and LEP 213 point to element 215 because Element 215 is the first and the last element of the queue, and that the pointer within Element 215 which would point to the next element points to null because it is the only element.

FIG. 15c shows the state of the FEP 212 and the LEP 213 pointers and elements 215 and 216 after element 216 has been inserted into the FIFO memory structure. Please note that the new element 216 is now the last element and its pointer is pointing to null. FIG. 15d shows the state of the FEP 212 and the LEP 213 pointers and the structure of the FIFO memory after three inserts into the FIFO memory structure. Please note that the first Element 215 points to the second Element 216 which points to the last Element 217, and the Element 217 points to the null address.

FIGS. 15b, 15c, and 15d illustrate how the size of the FIFO queue grows when new elements are added onto the end of the queue. In contrast, FIG. 15e illustrate how the elements are taken off the queue from the beginning or the front of the queue. FIG. 15e shows the state of the registers FEP 212 and the LEP 213 after the first element 215 has been taken off the queue. Please note that the FEP 212 now points to Element 216 which is the new first element of the queue.

In the preferred embodiment, the CBM 68 (see FIG. 4) is the memory in which the ATM cell data are kept in a FIFO queue. One or more registers reside within the CBMa 210 which point to various memory locations within the CBM, and the CBM is organized using a linked-list data structure.

Considering now FIGS. 16a, prior to cell buffer initialization, the CBMa memory pointers FEP 212, LEP 213, and Free Cell List (FCL) 220 are pointing to null and the memory segments 222 of the Cell Buffer Memory (CBM) 68 have not been linked to form a list. A Cell buffer initialization routine, listed below, causes the FCL 220 to point to the first available segment of the memory 222a. Thereafter, each memory segment is caused to point to the next available memory segment. The last available segment of the memory points to null. At this time, the FEP 212 and the LEP 213 continues to point to null because no cell elements containing ATM data has been added to the queue.

The following code (presented here in "C" language) performs the initialization of the transmit and receive cell buffer memory FIFO's when implemented by the CBMa 210:

```
1   typedef struct Cell_s = {
2       ushort  CellNext;
3       ushort  CellHEC:1,
4               CellCrc10:1,
5               Reserved:1,
6               CellPHY:5,
7               CellTbytes:6,
8               Res1:2,
9               CellEOM:1,
10              Res2:7;
11  #ifdef CELL_TAG
12      ulong Tag[CELL_TAG];
13  #endif
14      ulong CellHdr;
15      uchar Payld[48];
16  } Cell_t *pCell_t;
17
18  Cell_t  CellBuff[BufferSize]
19  ushort  TxHead, TxTail;
20  ushort  RxHead, RxTail;
21  ushort  FreeList;
22
23  for (ushort i = 1; i < BufferSize - 1; i++)
24      CellBuff[i].Next = (i + 1) * sizeof(Cell_t)
25  CellBuff[BufferSize - 1].Next = 0;
26  FreeList = 1;
```

© 1996, LSI Logic Corporation, Milpitas, California, USA.

In the preferred embodiment, the CBMa maintains several pointers into the CBM each of which represent different FIFO queues implemented as linked-lists in CBM 68. For instance, the register FCL points to the first memory segment of a linked-list of memory segments representing Free Cell Lists or a list of memory segment available for use, FEP 212 and LEP 213 lists to the first and the last elements of the FIFO queue representing memory segments being used to store ATM cell data. For ease of discussion, this document will refer to the FIFO queue pointed to by the FCL as the "FCL queue" and the FIFO queue being pointed to by the FEP and the LEP as the "ATM queue". At this time, all of the memory segments of the CBM 68 are available to be used and are elements of the FCL queue.

When ATM cells containing data is to be stored in the CBM 68, the CBMa 210 obtains a memory segment from the FCL 220, stores data in the memory segment, and maintains the FIFO memory structure by moving the memory segment containing the data from the FCL queue to the ATM queue. However, this movement of data is not accomplished by actual moving or copying of the data but rather by manipulating the pointers into the memory. The pointers such as the FEP 212, LEP 213, and FCL 220 are registers within the CBMa 210 and store the addresses of the memory segments.

FIGS. 16*b* illustrate how a memory segment is removed from the FCC queue and FIGS. 16*c* illustrate how the memory segment, after an ATM cell data has been written onto it, is inserted into the ATM queue. In particular, FIGS. 16*b* illustrates how the first available memory cell 222*a* is obtained by the CBMa 210 by utilizing another register as a pointer into the memory. In this embodiment, a pointer called Cell Pointer (CP) 224 which is initially pointing to null is caused to point to the first available memory segment 222*a* and the FCL 220 pointer which points to the first segment 222*a* of the FCL queue is caused to point to the second segment 222*b*, therefore making the segment 222*b* to be the new first available memory segment and the first element of the FCL queue.

Again, the CBMa 210 uses the following code in requesting and releasing a free cell location:

```
1   ushort GetFree ()
2   {
3      ushort CellNum = FreeList;
4      if (FreeList)
5         FreeList = CellBuff[CellNum].Next;
6      return CellNum;
7   }
```

© 1996, LSI Logic Corporation, Milpitas, California, USA.

FIGS. 16$c_1$–16$c_4$ illustrate how the segment 222*a*, newly obtained from the FCC 220, is placed into the ATM queue by causing the FEP 212 and the LEP 213 registers to point to the segment 222*a*.

FIGS. 16$c_1$ and 16$c_2$ illustrate how the segment 222*a* forms ATM queue of size one (1) when it is the first element in the ATM queue. In FIG. 16$c_1$, the FEP 212 and the LEP 213 are pointing to null because there are no elements in the ATM queue prior to inserting the new data element 222*a* pointed to by the CP224. As FIG. 16$c_2$ shows, insertion of the first element 222*a* into the ATM queue creates a an ATM queue of one element where the FEP 212 and the LEP 213 are pointing to the segment 222*a*. The only element 222*a*, also being the last element of the queue, has its pointer pointing to null.

FIGS. 16$c_3$ and 16$c_4$ illustrate how the new element 222*a* is inserted into an ATM queue with existing elements. FIG. 16$c_3$ shows the ATM queue prior to adding the new element 222*a*. The queue contains elements 222*m*, 222*n*, and 222*p* with the FEP 212 pointing to the first element 222*m*, and the LEP 213 pointing to the last element 222*p*, and the element 222*m* pointing to its next element 222*n*, which in turn is pointing to its next element 222*p*. The addition of the element 222*a* into this existing queue is done by causing the pointer of the last element of the list 222*p* and the LEP 213 to point to the new element 222*a*. The results of this operation is shown by FIG. 16$c_4$.

The following code, when implemented by CBMa 210 performs this insertion function:

```
1   void Put(ushort CellNum)
2   {
3      if (Tail != 0)
4         CellBuff[Tail].Next = CellNum;
5      else
6         Head = Tail = CellNum;
7      CellBuff[CellNum].Next = 0;
8   }
```

© 1996, LSI Logic Corporation, Milpitas, California, USA.

As illustrated by FIGS. 16*b* and 16$c_1$–16$c_4$, the movement of a segment of memory from a linked-list queue representing the list of available memory segments to the linked-list queue representing the list of data segments being used to store ATM cell data is accomplished merely by changing the value of the pointers maintained by CBMa 210 and the pointers internal to the linked-list. Using the similar technique, memory segments being used to store the ATM cells may be released from its linked-list queue and returned to the linked-list queue representing the memory segments available for use.

When a cell is returned to the Free List the Cell Buffer Manager CBMa 210 executes the following routine:

```
8    void ReturnFree (ushort CellNum)
9    {
10      CellBuff[CellNum].Next = FreeList;
11      FreeList = CellNum;
12   }
```

© 1996, LSI Logic Corporation, Milpitas, California, USA.

FIGS. 16*d* illustrate how, using the linked-list memory structure, a new cell may be placed in the middle of the ATM queue. To place a new data element 222*a* into the middle of the queue in between the elements 222*n* and 222*p*, for example, the pointer within the new element 222*a* is caused to point to the element which will becomes its next element, 222*p*. Then, the pointer of the element which currently points to 222*p* is caused to point to the new element 222*a*. By manipulating pointers in this way, the new element 222*a* becomes a member element of the queue and is inserted in the middle of the queue without requiring any other elements to be moved or copied.

FIGS. 16*e* illustrates how an element may easily be removed from the middle of the ATM queue without requiring surrounding elements to be copied or moved. To remove element 222*a* from the ATM queue, the CP 224 is caused to point to the element 222*a*. Then, the element 222*n* which currently points to the element 222*a* is caused to point to 222*a*'s next element which is 222*p*. Using these two simple pointer operations, element 222*a* is effectively removed from the middle of the ATM queue.

When a cell needs to be removed from a FIFO, the Cell Buffer manager 210 executes the following routine:

```
9    ushort Get ()
10   {
11      ushort CellNum = Head;
12      if (Head)
13         Head = CellBuff[Head].Next;
14      if (Head == 0)
15         Tail = 0;
16      return CellNum;
17   }
```

-continued

© 1996, LSI Logic Corporation, Milpitas, California, USA.

Using the linked-list implementation of the FIFO queue, segments of memory may be reserved for special use by simply taking it off the FCL linked-list queue and placing it onto another linked-list pointed to by another register in the CBMa 210. FIGS. 16f illustrate how the ATM queue containing elements 222a and 222b co-exists with another linked-list FIFO queue pointed to by the register 226 containing elements 222a and 222r (the "Reserved queue") and the FCL queue comprising elements 222m through 222z. Because the memory segments necessary to store ATM cell data is taken off the FCL queue and placed into the ATM queue, the memory segments comprising the Reserved queue are not affected.

Considering now FIGS. 16g, the ATM queue may be implemented using doubly linked-list. Each element of the doubly linked-lists contain an address pointer to the next element as well as an address pointer to the previous element. Using this technique, the list can be traversed from the beginning or from the end thereby making searches for a particular element more efficient. For example, to find the next to the last element 222y on the list in a singly linked-list, the list has to be traversed from the first element 222a through all the elements on the list until the next to the last element 222y is reached. In contrast, to find the element 222y in a doubly linked-list, the list is traversed from the last element 222z. In this example, the next to the last element 222y is found only after traversing only one element 222z. In a large linked-list environment, this increase in efficiency may be required in order to be able to handle increased activity. Accordingly, it is seen that the linked list of the present invention is linked both progressively (i.e., from beginning to end), and regressively (from end to beginning).

Hierarchical Calendar

Recalling the description of scheduler unit 46 and of FIG. 11 discussed above, it will be recalled that this unit manages a memory-resident calendar table. Each entry in the calendar table corresponds to one cell slot (i.e., time interval) and holds a list of VC's that need to be serviced in that slot. One of the important functions performed by ATMCSI/TU 32 is to appropriately shape user traffic before it is presented to the ATM network (recalling FIG. 1). This shaping can either be fixed for the duration of a connection (such as for VBR traffic), or can vary in response to network congestion (for example, for ABR traffic). Traffic shaping requires that cells from a connection (i.e, a VC) be scheduled for transmission at a specific time in the future. A very flexible way of achieving this scheduling is by use of calendars.

However, the ATMCSI/TU 32, in contrast with conventional ATM devices, provides an efficient scheme of arranging such a calendar. The implementation of this calendar frees memory space at the expense of a slight increase in processing burden for the APU 36 in comparison to the burden of maintaining a conventional calendar. The user of the ATMCSI/TU 32 may use either the efficient calendar scheme, or another user-selected and programmed software-implemented calendar scheme. However, us of software-implemented alternative calendar schemes may increase the processing burden on the APU 36 and also increase memory requirements for this function.

In order to avoid the disadvantages and limitations of conventional calendar structures and methods discussed above, the present invention uses a software implemented hierarchical calendar having at least two separate arrays. viewing FIG. 17, it is seen that the calendar 250 includes at least two calendar arrays 252 and 254. Conceptually, these arrays 252 and 254 may be considered to be circular, but those ordinarily skilled in the pertinent arts will realize that the arrays may also be conceptualized as a recirculating list of memory locations or addresses holding linked descriptors. The upper array 252 is of size N (i.e., includes N equal sectors or slots), while the lower array 254 is of size M. The upper array 252 has an event pointer 256 which moves step-wise from one slot to the next with a time period equal to the interval of one cell slot. Array 254 likewise has an event pointer 258 which moves step-wise from one slot to the next with a time period equal to N multiplied by T, where T is the time interval of a single cell slot. Hence, for each cycle of the event pointer 256 around the array 252, the event pointer 258 moves only from one sector to the next of array 254.

As an example of how this hierarchical calendar is used, suppose that the duration of a single cell slot is equal to $1/353,000$ second (corresponding to the OC-3 bit rate of 150 Mbps). Then N=353, and M=1000. Thus, array 252 counts microseconds, and array 254 counts milliseconds. If, for example, and event is to be scheduled for a time 100.25 ms in the future, then it (its descriptor, that is) is first attached to a linked list at slot number 100 (from the present pointer location) in array 254. After the pointer 258 for array 254 advances 100 sectors in an interval of 100 milliseconds, the descriptor is transferred to array 252 such that it is scheduled 250 microseconds into the future.

The maximum time interval of events that can be scheduled using a hierarchical calendar of two levels, like the calendar 250, is equal to MxNxT seconds. However, a wide range of memory requirement versus processing burden tradeoffs are now possible using a calendar of this type with two or more arrays. For example, one of the calendar hierarchies could have a larger size, or a calendar of three or more levels or hierarchies may be used in the way described herein to schedule events longer intervals into the future. For purposes of economizing on memory use, it is preferable to use additional hierarchies rather than increasing the size of any one hierarchy in order to time longer intervals into the future. With the illustrated two-level hierarchical calendar of 353×1000=353,000 array sizes, the memory requirement is only 5412 bytes. This reduction in memory requirement is achieved at the expense of a slightly increase processing burden for the APU 36 because the event descriptors have to be transferred from one hierarchy to the other between the time of scheduling an event and the time of its implementation.

Scheduler-Based Support of VBR traffic

Keeping in mind the above description of the time management team (i.e., the timer 44 and scheduler 46), and recalling the description above concerning different classes of service, attention can now be directed to another aspect of scheduler 46. It will be recalled that all of the interconnections of an ATM service may belong to different classes of service. Video connections are not usually serviced with the same class of service as are file transfers. The file transfers are not sensitive to delay, but are sensitive to loss of cells. Video transfers are sensitive to delay and are more tolerant of cell loss. Audio transfers are tolerant of cell loss and less tolerant of delay. Accordingly, the class of service known as variable-bit-rate service is usually used to transmit compressed video images without delay. Ordinarily, this VBR traffic is scheduled with a common algorithm using traditional timer-based techniques.

Three important qualities are associated with VBR traffic. One quality is called "Peak Cell Rate" (PCR), and is the maximum rate at which cells can be transmitted over a VC. "Sustainable Cell Rate" (SCR) is the average rate at which cells can be transmitted over a VC, and is always less than PCR. And "Maximum Burst Size" (MBS) is the maximum number of cells back-to-back which can be transmitted at PCR into a network. The timers are conventionally set to time-out or expire every 1/PCR seconds. Every time the timers time out, the conventional ATM device uses an algorithm promulgated by the ATM Forum to determine whether new cells can be transmitted or deferred to a later time. This algorithm is known as the "Generalized Cell Rate Algorithm" (GCRA).

Those skilled in the pertinent arts will know that in the event an ATM connection is generating cell traffic at a rate greater than SCR, then the traffic shaping algorithm will allow cells to be transmitted at a rate not exceeding SCR. In this case, even though the timers are set to time out every 1/PCR second, the new cells are not eligible for transmission until at least 1/SCR seconds have elapsed. As a result, the processors of conventional ATM devices waste CPU cycles in executing a GCRA calculation every 1/PCR seconds when the result is always to allow cell transmissions only once per 1/SCR seconds. These wasted processor cycles further reduce the capacity of the ATM device to service other VC's.

In order to avoid the conventional limitation outlined above, the ATMCSI/TU 32, via the scheduler 46, implements a modified algorithm which computes a variable time interval in the future at which a cell transmission should next be scheduled. This variable and pre-calculated time interval avoids having to use processor cycles to compute the GCRA every 1/PCR seconds, and allows the modified algorithm to be calculated over the longer interval of no more frequently than 1/SCR seconds. The timing in the future at which cell transmission events are scheduled is implemented using the hierarchical calendar described immediately above. In order to avoid the problem described above, every time a cell is transmitted, the nearest time in the future at which the next conforming cell may be transmitted is calculated. This time is set in the hierarchical calendar, and when the time interval times out, the cells are transmitted.

The following is a pseudo code listing of the modified GCRA:

```
1   if sustainable cell rate event
2   {
3       X = LBC - (T - LCT)
        t = max (X + I - (1/PCR) - L,0)
4       if CS-PDU empty and no other CS-PDU queued
5       {
6           Set VC to idle
7           Process next VC
8       }
        else
9       {
10          next SCR event scheduled at
            T+(1/PCR) + T
            LBC = X + I
            LCT = T
            Send Cell
11      }
12  }
13  if new CS_PDU event
14  {
15      Set VC to active
16      next SCR event scheduled at next cell slot
17  }
```

© 1996, LSI Logic Corporation, Milpitas, California, USA.

In which, X= a temporary variable, LBC is the content of a count down timer, T is the current time, LCT is the time when the last conforming cell was transmitted, L is the limit of the burst size tolerance, and I is the increment in time (i.e., 1/SCR seconds). The variable "t" represents the additional time in the future after the interval 1/PCR seconds, and beyond which the next conforming cell must wait before it can be transmitted.

Thus, it is seen that with the present ATMCSI/TU 32, even when the cell transmission traffic interval becomes shorter and approaches 1/PCR, the interval between transmissions is not limited to 1/SCR, and the processor is not burdened with having to calculate the time for the next transmission according to the conventional GCRA, which always gives the result of 1/SCR as the time interval between transmissions. Instead the present ATMCSI/TU 32, uses the modified algorithm set out above and saves the processor (APU 36) from wasting clock cycles, while precisely scheduling the next cell transmissions a variable interval in the future, set by use of the hierarchical calendar described above.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. An asynchronous transfer mode (ATM) communication device for use in an ATM communication system network and having particular facility for carrying out variable bit rate (VBR) service, said device comprising:

a programmable processor servicing virtual connections (VC's) of said network by transmitting data cells, said programmable processor including means for servicing the VC's at a peak cell rate (PCR), at a sustainable cell rate (SCR) which is less than said PCR, and at maximum burst size (MBS) of cells transmitted at PCR; said programmable processor having associated memory for storing a conversion sublayer protocol data unit (CS-PDU) and including means for implementing a selected algorithm in order to time next service of a VC, said selected algorithm being expressed as:

```
1   if sustainable cell rate event
2   {
3       X = LBC - (T - LCT)
        t = max (X + I - (1/PCR) - L,0)
4       if CS-PDU empty and no other CS-PDU queued
5       {
6           Set VC to idle
7           Process next VC
```

```
 8            }
          else
 9        {
10            next SCR event scheduled at T+(1/PCR) + T
                 LBC = X + I
                 LCT = T
                 Send Cell
11        }
12    }
13 if new CS[__]-PDU event
14    {
15        Set VC to active
16        next SCR event scheduled at next cell slot
17    }
``` in which, X is a temporary variable, LBC is the content of a count down timer accessible to said programmable processor, T is the current time, LCT is the time when the last conforming cell was transmitted, L is the limit of the burst size tolerance, and I is the increment in time equal to 1/SCR seconds, and "t" is the additional time in the future after the interval 1/PCR seconds at which the next conforming data cell may be transmitted.

2. The ATM communication device of claim 1 wherein said device further includes a pre-configured scheduler processor also including internal register means for maintaining a copy of certain characteristics of VC's being serviced and to be serviced at times to be determined, said certain characteristics including: Buffer—a pointer to a buffer memory location descriptor for a VC to be serviced or in service; present Buffer—a pointer to a buffer memory location for a VC in service; current virtual circuit descriptor (current VCD)—a pointer to the current virtual circuit being serviced.

3. The ATM communication device of claim 1 wherein said programmable processor further exercised executive control over said scheduler processor to operate the latter in one of two selected modes of operation, said two selected modes of operation including: flat rate mode, and priority mode.

4. A data-structure driven asynchronous transfer mode (ATM) communication device for receiving, processing, and transmitting a plurality of data cells in an ATM communication system network, said device comprising:

memory means for receiving, storing and recovering ATM communication system protocol data units (CS-PDU's), data-structures of linked lists with memory address pointers to starting and ending memory addresses as well as internal memory address pointers to successive elements of said linked-list data structures by memory addresses in succession and regression, and calendar entries;

a permanently pre-configured scheduler processor configured to maintain a calendar-based scheduler table having entries of virtual connections (VC's) to be serviced in sequential cell slot time intervals to receive CS-PDU's from said memory means;

programmable processor means servicing VC's according to said calendar-based scheduler table, and said programmable processor including means for servicing the VC's at a peak cell rate (PCR), at a sustainable cell rate (SCR) which is less than said PCR, and at a maximum burst size (MBS) of cells transmitted at PCR; said programmable processor including means for implementing a selected algorithm in order to time next service of VC's according to entries entered by said programmable processor in said scheduler table, said selected algorithm being expressed as:

```
 1 if sustainable cell rate event
 2    {
 3        X = LBC - (T - LCT)
          t = max (X + I - (1/PCR) - L,0)
 4        if CS-PDU empty and no other CS-PDU queued
 5        {
 6            Set VC to idle
 7            Process next VC
 8        }
          else
 9        {
10            next SCR event scheduled at T+(1/PCR) + T
                 LBC = X + I
                 LCT = T
                 Send Cell
11        }
12    }
13 if new CS__PDU event
14    {
15        Set VC to active
16        next SCR event scheduled at next cell slot
17    }
``` in which, X is a temporary variable, LBC is the content of a count down timer accessible to said programmable processor, T is the current time, LCT is the time when the last conforming cell was transmitted, L is the limit of the burst size tolerance, and I is the increment in time substantially equal to 1/SCR seconds, "t" is the additional time in the future after the interval 1/PCR seconds at which the next conforming data cell may be transmitted.

5. The ATM communication device of claim 4 wherein said device further includes a pre-configured timer having means for maintaining plural hardware-implemented timers accessible to said pre-configured scheduler processor to measure said cell slot time intervals and schedule VC services therein according to said entries entered by said programmable processor in said scheduler table.

6. A method for determining a transmission time for particular data cells each known as a conversion sublayer protocol data unit (CS-PDU) in an asynchronous transfer mode (ATM) communcation system network, said method comprising:

providing memory means holding said data cells;

providing a programmable processor, and utilizing said programmable processor to calculate a transmission time for particular data cells according to the following algorithm:

```
 1 if sustainable cell rate event
 2    {
 3        X = LBC - (T - LCT)
          t = max (X + I - (1/PCR) - L,0)
 4        if CS-PDU empty and no other CS-PDU queued
 5        {
 6            Set VC to idle
 7            Process next VC
 8        }
          else
 9        {
10            next SCR event scheduled at T+(1/PCR) + T
                 LBC = X + I
```

```
                    LCT = T
                    Send Cell
11              }
12      }
13  if new CS_PDU event
14      {
15          Set VC to active
16          next SCR event scheduled at next cell slot
17      }
``` in which, X is a temporary variable, LBC is the content of a count down timer accessible to said programmable processor, T is the currnet time, LCT is the time when the last conforming cell was transmitted, L is the limit of the burst size tolerance, and I is the increment in time substantially equal to 1/SCR seconds, "t" is the additional time in the future after the 1/PCR seconds at which the next conforming data cell may be transmitted.

* * * * *